United States Patent [19]
Nakai et al.

[11] Patent Number: 6,072,454
[45] Date of Patent: Jun. 6, 2000

[54] LIQUID CRYSTAL DISPLAY DEVICE

[75] Inventors: Yutaka Nakai, Yokohama; Masahiko Akiyama, Tokyo; Tsuyoshi Hioki, Yokohama, all of Japan

[73] Assignee: Kabushiki Kaisha Toshiba, Kawasaki, Japan

[21] Appl. No.: 08/808,855

[22] Filed: Feb. 28, 1997

[30] Foreign Application Priority Data

Mar. 1, 1996 [JP] Japan ..................................... 8-045072
Mar. 1, 1996 [JP] Japan ..................................... 8-045075

[51] Int. Cl.[7] .............................. G09G 3/36; G02F 1/136
[52] U.S. Cl. ............................................... 345/97; 349/41
[58] Field of Search .................................. 345/90, 92, 97; 349/41, 42, 43, 44, 45, 46, 47; 348/797; 315/169.4; 365/145; 257/295

[56] References Cited

U.S. PATENT DOCUMENTS

| | | | |
|---|---|---|---|
| 3,725,899 | 4/1973 | Greubel ..................................... | 345/89 |
| 4,432,610 | 2/1984 | Kobayashi et al. ........................ | 349/42 |
| 5,349,366 | 9/1994 | Yamazaki et al. ......................... | 345/92 |
| 5,412,596 | 5/1995 | Hoshiba .................................... | 365/145 |
| 5,642,213 | 6/1997 | Mase et al. ................................ | 349/43 |
| 5,668,754 | 9/1997 | Yamashita ................................. | 365/145 |

FOREIGN PATENT DOCUMENTS 5-119298  5/1993  Japan .

OTHER PUBLICATIONS

Japanese Abstract 3–89391, Apr. 15, 1991.

*Primary Examiner*—Mark K. Zimmerman
*Assistant Examiner*—Thu Nguyen
*Attorney, Agent, or Firm*—Oblon, Spivak, McClelland, Maier & Neustadt, P.C.

[57] ABSTRACT

A liquid crystal display device of the present invention includes a liquid crystal layer intervened between a first and a second electrode; a circuit for applying a first data signal; a circuit for applying a second data signal; a circuit for holding a selecting signal; and a selecting circuit for applying the first data signal or the second data signal to the first electrode corresponding to the selecting signal held in the holding means. A state of applying the first data signal to a pixel and a state of applying the second data signal to the pixel are determined corresponding to a selecting signal. Since these two states are held by the holding circuit, the selecting signal is not required to be applied when an image displayed does not change, and power consumption is lowered extensively. In addition, a liquid crystal display device of the invention includes a liquid crystal layer intervened between a first electrode and a second electrode; a memory which is connected to the first electrode and holds a data signal as a capacitance variable corresponding to the data signal; and a circuit for applying an AC voltage to the first electrode or the second electrode. When the AC voltage is applied to the first electrode or the second electrode, the applied AC voltage is divided by a capacitance held by the memory and a capacitance of the liquid crystal layer, thereby enabling to make gradational display.

18 Claims, 11 Drawing Sheets

A RANGE OF VOLTAGE APPLIED TO THE MEMORY UNIT

A RANGE OF VOLTAGE APPLIED TO THE MEMORY UNIT the drive frequency of a signal line driver IC is the product of the number of all pixels on the screen and a frame frequency, and, if a division drive is performed, it is a value obtained by further dividing by a division number. For example, in a diagonally 10.4-inch color VGA (640×RGB×480 pixels) liquid crystal display device, a signal line IC has power consumption of about 1 W. Therefore, an A4-size 150 dpi-equivalent high definition liquid crystal display device has the number of pixels of about 1600×1200 6.25 times greater than VGA, resulting in a disadvantage that power consumption is as high as 2 to 3 W or more. When a high power-consuming liquid crystal display device is used for any portable information-processing equipment, there are disadvantages that a battery exhausts soon and the usable duration is shortened.

LIQUID CRYSTAL DISPLAY DEVICE

BACKGROUND OF THE INVENTION

1. Field of the Invention

The present invention relates to a liquid crystal display device. And, the invention relates to a liquid crystal display device which can make gradational display. The invention particularly relates to a liquid crystal display device where each pixel is provided with a memory element for storing a data signal applied.

2. Description of the Related Art

Liquid crystal displays are thin and low electric power consumers and being used extensively for notebook computers and other electrical equipments. One of remarkable features of the liquid crystal display device is its particularly low power consumption as compared with other display devices such as CRTs and plasma displays, and its future application to portable information-processing equipment is expected.

Such portable equipment is desired to have a display which consumes low power of 500 mW or below, and preferably several mW. In response to such a demand, a reflective type liquid crystal display device has been used conventionally, because it is a simple matrix type using a TN (twisted nematic) liquid crystal, does not need a back light, and consumes only low electric power. But, this display has a disadvantage that since the TN type liquid crystal needs a polarizer, its reflectance is about 30% and dark. Besides, the simple matrix type has a disadvantage that when the number of pixels is increased, contrast is lowered, and display image quality is deteriorated. Therefore, using a PCGH (phase change guest host type) mode liquid crystal not requiring to use a polarizer and driving by active matrices, there has been an attempt to produce a display provided with a high reflectance and a high contrast.

FIG. 7 shows one example of the circuit structure of a pixel in a conventional liquid crystal display device. This circuit structure of the pixel shown in FIG. 7 is the same as a conventional transmission active matrix liquid crystal display device. When a thin film transistor (TFT) 93 is turned on by a scan signal applied to a gate line 92, a data signal voltage applied to a signal line 91 is applied to a liquid crystal layer 94. And, an electrical charge is applied to a storage capacitance 96 by a storage capacitance line (Cs line) 95. As it is known well, it is generally necessary to apply an alternating voltage to the liquid crystal layer 94, and the data signal voltage, which becomes positive or negative with a voltage of an opposed electrode 97 formed on an opposed substrate at the center, is applied to the signal line 91 to drive the pixel.

Such a liquid crystal display device needs the application of an AC voltage to the liquid crystal layer even when the displaying image does not change at all. Therefore, a pixel potential is renewed whenever selected by frame cycling. Power consumption P when an alternating voltage is applied to the capacitance is expressed as follows:

$$P = f \times V^2 \times C$$

where, f denotes a frequency, V a voltage, and C capacitance. Therefore, the higher the frequency, the higher the voltage or the higher the capacitance, the higher the power consumption becomes.

For the AC drive of the liquid crystal display device, the drive frequency of each pixel is a frame frequency, the drive frequency of a signal line is the product of a frame frequency and the number of scanning lines, the drive frequency of a signal line driver IC is the product of the number of all pixels on the screen and a frame frequency, and, if a division drive is performed, it is a value obtained by further dividing by a division number. For example, in a diagonally 10.4-inch color VGA (640×RGB×480 pixels) liquid crystal display device, a signal line IC has power consumption of about 1 W. Therefore, an A4-size 150 dpi-equivalent high definition liquid crystal display device has the number of pixels of about 1600×1200 6.25 times greater than VGA, resulting in a disadvantage that power consumption is as high as 2 to 3 W or more. When a high power-consuming liquid crystal display device is used for any portable information-processing equipment, there are disadvantages that a battery exhausts soon and the usable duration is shortened.

On the other hand, it is known that power consumption can be reduced by using a bistable ferroelectric liquid crystal (SSFLC: Surface Stabilized Ferroelectric Liquid Crystal). Since the ferroelectric liquid crystal has a memory, the voltage supply can be stopped unless the screen is changed. But, the bistable ferroelectric liquid crystal has a disadvantage that its orientation is disturbed by an impact, resulting in a screen failure. Therefore, it cannot be used for a portable display device. Besides, the liquid crystal having memory often has its contrast and reflectance limited, and its display has a problem in quality. For example, the SSFLC in the display mode needs a polarizing plate and the screen is dark with the reflectance of about 30%. Besides, since what is displayed by the SSFLC is basically limited to a binary display because it is bistable, its presentation capacity (namely, a volume of information) is lowered to great extent as compared with the display mode which can make gradation display. This constitutes a very serious problem in making a color display. When spatial light modulation is made by a dither method or the like to make the gradation display, effective resolution is degraded. Besides, when temporal modulation is made by frame rate control or the like, a flicker takes place, thus the SSFLC cannot be applied to animations.

As described above, the displays for a personal computer and portable information-processing equipment show mostly still images, and an alternating voltage is supplied to a signal line even when the screen is not changed, resulting in waste of electric power.

In view of the circumstances, the present invention aims to remedy the above-described disadvantages and to provide a liquid crystal display device which does not consume much electric power.

And, the invention aims to achieve high resolution with a simplified pixel circuit.

New display devices have been developed to take the place of the conventional CRTs in recent years. Among such display devices, liquid crystal displays which are thin and do not consume much power are being used broadly for OA equipment.

The liquid crystal display devices are classified into a simple matrix type and an active matrix type using an active element in view of the differences in their driving methods. Main liquid crystal display devices are of the active matrix type excelling in display performance.

FIG. 11 is a diagram showing one example of the circuit structure of a pixel in a conventional active matrix liquid crystal display device. Each pixel is provided with, for example, a thin film transistor 1 as a switching element. The thin film transistor 1 is turned on or off by a scan signal applied to a scanning line 3. When the pixel is selected, namely when the thin film transistor 1 is on, a data signal applied to a signal line 4 is applied to a liquid crystal layer 2 through a source and drain of the thin film transistor 1. When the pixel is not selected, the state of the liquid crystal is held by the capacitance of the liquid crystal layer 2 itself and a storage capacitance 5. But, the change in the state of pixel with time due to the movement of an electric charge in the storage capacitance 5 and in the capacitance of the liquid crystal ($C_{LC}$) can not be avoided. Accordingly, the data signal applied to the pixel is refreshed in a cycle of about 1/60 seconds.

Even when the data signal applied to the pixel does not change while displaying, for example, a still image, the above conventional liquid crystal display device needs the data signal applied to the pixel refreshed frequently. This is a big barrier against the reduction of power consumption. Portable information-processing equipment and OA equipment often display a still image, consuming excess power. Particularly, when the portable information-processing equipment is a high power consumer, there is a disadvantage that its usable duration is shortened.

To remedy such a disadvantage, a method of using a bistable ferroelectric liquid crystal (SSFLC) has been proposed as described above. But, it has disadvantages in operation stability and display quality. For example, its orientation is disturbed by an impact, resulting in a screen failure. Therefore, it cannot be used as a portable display device. Besides, since the selection is limited to on and off of light, spatial modulation is required for halftone display, and resolution is degraded.

Japanese Patent Laid-Open Application No. Hei 5-119298 discloses an example of providing each pixel with an image information storage function by incorporating a ferroelectric substance into each pixel as a memory element. An equivalent circuit diagram of a pixel of this liquid crystal display device is shown in FIG. 18A. In this circuit, an AC voltage is applied to an opposed electrode, and according to the state of a ferroelectric layer 8, a thin film transistor 1 which has the ferroelectric layer 8 connected to a gate electrode is turned on or off. As a result, a terminal A has a predetermined potential or a floating state and can select two states as an AC voltage to be applied to a liquid crystal layer 2. However, even this example cannot display halftone. It needs to adopt spatial modulation to display halftone, but display quality is deteriorated. Besides, the terminal A falls in a floating state, and its stable operation is deteriorated.

On the other hand, Japanese Patent Laid-Open Application No. Hei 3-89391 discloses an example of a liquid crystal display device using a thin film transistor having memory. An equivalent circuit diagram of a pixel of this liquid crystal display device is shown in FIG. 18B. In this example, a voltage divided by a thin film transistor 1 and a thin film transistor having memory with image information written is outputted to a terminal A, and this output voltage is applied to a liquid crystal layer 2. This liquid crystal display device can control gradation in an analog fashion, but the voltage to be applied to the liquid crystal layer 2 includes a DC component. It is known that the liquid crystal layer 2 is deteriorated by the presence of the DC component. Thus, its display is questionable in view of reliability.

As described above, the conventional active matrix liquid crystal display device showing a still image needs to renew the image frequently and has a disadvantage of consuming much power. Besides, the conventional liquid crystal display device using a ferroelectric liquid crystal or a ferroelectric substance is technically difficult to store a halftone data signal or to make display without degrading reliability. And, it also has a disadvantage of lowering the display resolution.

In view of the above-described disadvantages, an object of the present invention is to provide a liquid crystal display device which can store halftone image information (data signal) into each pixel and which has high image quality and high reliability without consuming much power.

SUMMARY OF THE INVENTION

So as to remedy the above-described disadvantages, the liquid crystal device of the invention has the following features.

In a first aspect of the invention a liquid crystal display device comprises a liquid crystal layer intervened between a first and a second electrode; means for applying a first data signal; means for applying a second data signal; means for holding a selecting signal; and a selecting means for applying the first data signal or the second data signal to the first electrode corresponding to the selecting signal held in the holding means.

Here, the first electrode indicates, e.g., a pixel electrode, and the second electrode, e.g., is an opposed electrode. And, a reference potential means a potential of the opposed electrode, e.g., a ground potential. A pixel comprises the first electrode, the second electrode, and a liquid crystal layer intervened therebetween.

A first data signal and a second data signal control a state of a selected pixel, namely the state of the liquid crystal layer intervened between the first electrode and the second electrode. The first data signal and the second data signal may be different from each other. One of the first data signal and the second data signal may be a direct current and the other an alternating voltage, or both of them may be a direct current or an alternating voltage. For example, an alternating voltage may be applied as the first data signal, and a constant predetermined potential may be applied as the second data signal.

Means for supplying the first data signal and means for supplying the second data signal take the form of, for example, a feeder. In addition to the means for supplying the first data signal and the means for supplying the second data signal, means for supplying a third data signal and means for supplying a fourth data signal may be provided to selectively apply the data signals supplied by these means to the liquid crystal.

A selecting signal which is a signal for selecting a pixel state is applied from a drive circuit through a selecting signal line, for example. The switching element, e.g., an FET having a gate connected to a scanning line, is provided between the selecting signal line and a ferroelectric substance. The state of a predetermined pixel can be controlled by the scanning line, the selecting signal line, and the switching element. In other words, a data signal to be applied to an arbitrary pixel selectively can be selected by the selecting signal from the first data signal and the second data signal.

As holding means for holding the selecting signal, for example, the ferroelectric substance may be used, but another element having memory may be used. When the ferroelectric substance is used, the selecting signal can be held as a polarized state of the ferroelectric substance.

A selecting means for applying the first data signal or the second data signal to the first electrode corresponding to the selecting signal held in the ferroelectric substance takes the form of, for example, a switching element, but may be a control element as well. As the switching element, a pair of p-channel and n-channel field effect transistors are available. The field effect transistors include a thin film transistor. The thin film transistor can be designed to have a structure such as a top gate type or a bottom gate type as required. In addition, by applying the same signal to the gates of the p-channel and n-channel field effect transistors, one of them can be turned on and the other off in a complementary manner to select a voltage to be applied to the first electrode.

The selecting means may take the forms of a first switching element and a second switching element which in a complementary manner turn on or off corresponding to a selecting signal held by the holding means. When the first switching element is turned on, the first data signal is applied to the first electrode, and when the second switching element is turned on, the second data signal is applied to the first electrode.

For example, a ferroelectric substance may be employed as the holding means to turn on or off the first switching element and the second switching element which comprise the selecting means corresponding to the polarized state of the ferroelectric substance. When the selecting means comprises a field effect transistor, the ferroelectric substance may be provided as the gate insulator film of the field effect transistor, but may also be provided as an element separate from the field effect transistor.

Since a remanent polarization of the ferroelectric substance is stably held, it is possible to hold a state that the first or second data signal is applied to the liquid crystal layer.

When it is designed that the first switching element and the second switching element which comprise the selecting means are turned on or off corresponding to the polarization of the ferroelectric substance, it is possible to automatically switch between a state that the first data signal is applied to the liquid crystal layer and a state that the second data signal is applied to the liquid crystal layer. The first and second switching elements which turn on or off complementary have the form of, for example, a pair of complementary MISFETS. The gate of the complemental MISFETs may be provided with a ferroelectric substance as the holding means, or the ferroelectric substance may be connected to the gate of the complemental MISFETs. The ferroelectric substance may be divided for the first switching element and the second switching element, or may be formed into a unified element for common use.

In a second aspect of the a liquid crystal display device comprises a liquid crystal layer intervened between a first and a second electrode; means for applying a first data signal; means for applying a second data signal; a selecting means for applying one of the first data signal or the second data signal to the first electrode; and a holding means for holding a selected state of the selecting means.

The above-described first aspect of the liquid crystal display device of the invention applies the first or second data signal to the first electrode corresponding to the selected signal held by the holding means to control the state of a pixel. To the contrary, the second aspect of this invention applies either the first data signal or the second data signal to the first electrode by the selecting means, and the holding means holds a state that the first data signal or the second data signal is applied to the first electrode. For example, an element which can hold such a state stably may be used as the ferroelectric substance does.

In a third aspect of the invention a liquid crystal display device comprises a liquid crystal layer intervened between a first and a second electrode; a first signal line for supplying a first data signal; a second signal line for supplying a second data signal; a p-channel field effect transistor provided so as to connect the first signal line and a first electrode when it is turned on, and the p-channel field effect transistor having a ferroelectric substance for holding a selecting signal at a gate; and a n-channel field effect transistor provided so as to connect the second signal line and the first electrode when it is turned on, and the n-channel field effect transistor having a ferroelectric substance for holding the selecting signal at a gate.

The device may also to comprise a first signal line for supplying a first data signal; a second signal line for supplying a second data signal; a p-channel field effect transistor which has a ferroelectric substance for holding a selecting signal at a gate and a source-drain provided between the first signal line and a liquid crystal layer; and an n-channel field effect transistor which has a ferroelectric substance for holding the selecting signal at a gate and a source-drain provided between the second signal line and the liquid crystal layer.

In a fourth aspect of the invention a liquid crystal display device comprises a liquid crystal layer intervened between a first and a second electrode; a first signal line for supplying a first data signal; a second signal line for supplying a second data signal; at least one ferroelectric substance for holding a selecting signal; a p-channel field effect transistor provided so as to connect the first signal line and a first electrode when it is turned on, and a potential corresponding to the selecting signal held by the ferroelectric substance is applied to a gate of the p-channel field effect transistor; and an n-channel field effect transistor provided so as to connect the second signal line and the first electrode when it is turned on, and the potential corresponding to the selecting signal held by the ferroelectric substance is applied to a gate of the n-channel field effect transistor.

The device may also comprise a first signal line for supplying a first data signal; a second signal line for supplying a second data signal; a ferroelectric substance for holding a selecting signal; a p-channel field effect transistor which has a potential corresponding to the selecting signal held by the ferroelectric substance applied to a gate and a source-drain provided between the first signal line and a liquid crystal layer; and an n-channel field effect transistor which has a potential corresponding to the selecting signal held by the ferroelectric substance applied to a gate and a source-drain provided between the second signal line and the liquid crystal layer.

In a fifth aspect of the invention a liquid crystal display device comprises a first signal line for supplying a first data signal; a second signal line for supplying a second data signal; a first ferroelectric substance for holding a potential corresponding to a selecting signal; a second ferroelectric substance for holding the potential corresponding to the selecting signal; a p-channel field effect transistor provided so as to connect the first signal line and a first electrode when it is turned on, and the potential corresponding to the selecting signal held by the first ferroelectric substance is applied to a gate of the p-channel field effect transistor; and an n-channel field effect transistor provided so as to connect the second signal line and the first electrode when it is turned on, and the potential corresponding to the selecting signal held by the second ferroelectric substance is applied to a gate of the n-channel field effect transistor. The ferroelectric substance can be a ferroelectric capacitor, a element having a MFS layered structure (Metal-Ferroelectric substance-Semiconductor layer), a element having a MFIS layered structure (Metal-Ferroelectric substance-Insulator-Semiconductor layer), and a element having a MFMIS layered structure (Metal-Ferroelectric substance-Metal-Insulator-Semiconductor layer), in the invention It is also possible to comprise a first signal line for supplying a first data signal; a second signal line for supplying a second data signal; a first ferroelectric capacitor for holding a potential corresponding to a selecting signal; a second ferroelectric capacitor for holding a potential corresponding to the selecting signal; a p-channel field effect transistor which has the potential held by the first ferroelectric capacitor applied to a gate and a source-drain provided between the first signal line and a liquid crystal layer; and an n-channel field effect transistor which has the potential held by the second ferroelectric capacitor applied to a gate and a source-drain provided between the second signal line and the liquid crystal layer.

In a sixth aspect of the invention a liquid crystal display device comprises a liquid crystal layer intervened between a first electrode and a second electrode; means for applying a first data signal; means for applying a second data signal; and a drive element which is covered with the first electrode, selects a first or second data signal corresponding to a selecting signal to apply it to the first electrode, and has a ferroelectric substance for holding the selecting signal.

When the first electrode is a pixel electrode, the drive element is covered by the pixel electrode. When the pixel electrode is determined to be a reflective electrode, the invention can be applied to a reflective liquid crystal display device. In this case, flexibility of designing the drive element having the selecting means and the holding means is improved.

As the drive element, for example, the above-described field effect transistor is available. Since the field effect transistor is provided with the ferroelectric substance for holding the selecting signal, the variation of electrical characteristics of the field effect transistor is reduced to a negligible level against the variations of a parasitic capacitance between the pixel electrode and the gate of the field effect transistor. Thus, display image quality is improved.

A seventh aspect of the invention is a device comprising a liquid crystal layer intervened between a first electrode and a second electrode; a memory means which is connected to the first electrode and holds a data signal as a capacitance variable corresponding to the data signal; and means for applying an AC voltage to the first electrode or the second electrode.

Here, the second electrode is, for example, an opposed electrode, and the first electrode is, for example, a pixel electrode. The AC voltage is satisfactorily applied to either the opposed electrode or the pixel electrode.

For the liquid crystal, a guest-host liquid crystal, a guest-host liquid crystal turned by 90 to 360 degrees or an amorphous guest-host type liquid crystal in which orientation is random is effective to enhance contrast and reflectance. And, a TN type may be used, and a selective reflection-transmission mode using a cholesteric liquid crystal, a ferroelectric liquid crystal, an anti-ferroelectric liquid crystal, a polymer-dispersed liquid crystal, or an OCB mode liquid crystal may also be used. A display method is also arbitrary, and may be any type to control transmission-absorption, transmission-dispersion, or dispersion-absorption in view of classification based on a method for optical changes by the liquid crystal layer. Since the number of elements configuring the pixels is increased in the liquid crystal display device of the invention, it is preferable to use a reflective liquid crystal display device which has an insulator film provided on the elements and the pixel electrode formed thereon. Although it is predicted that the pixel size is limited, it can also be applied to a transmission type liquid crystal display device. And, the invention can be applied to a monochrome liquid crystal display device and also to a color liquid crystal display device. And, the liquid crystal layer may be formed of a single layer or a multiple layer.

The alternating voltage to be applied by the means for applying an AC voltage may be a pulse profile and a sine wave profile as well, and a periodic data signal writing period may be included.

The data signal may be applied to the memory means by the signal line through, for example, a TFT. The switching element such as an MIM (Metal-Insulator-Metal) in addition to the TFT may be used to select a pixel in which the data signal is written.

To use as the memory means, for example, a multilayered structure of a metal electrode, a ferroelectric layer and a semiconductor layer; a structure having an insulator between a ferroelectric layer and a semiconductor layer, a structure having a metal electrode and an insulator between a ferroelectric layer and a semiconductor layer, and the like may be connected in parallel and to have a reversed polarity. However, any types can be used if they have a function of dividing the AC voltage in an AC fashion corresponding to a data signal when an AC voltage is applied to the second electrode. The applied AC voltage is divided with a capacitance of the memory means and a capacitance including a capacitance of the liquid crystal ($C_{LC}+C_{CS}$, for example), and the ratio of the voltage applied to the liquid crystal is controlled by the data signal held in the memory means as a capacitance.

For the ferroelectric substance, an inorganic compound such as PZT, $LiNbO_3$, $BaTiO_3$, PMN or $Bi_4Ti_3O_{12}$ may be used, and an organic compound may also be used. As the organic compound, an organic thin film of polyvinylidene fluoride which has undergone an orientation treatment may be used.

In addition to the seventh aspect, an eighth aspect of the invention is a liquid crystal display device comprising that, when the AC voltage is applied to the first electrode or the second electrode, the memory means divides the applied AC voltage by a capacitance held by the memory means and a capacitance of the liquid crystal layer. The applied AC voltage is divided by the capacitance held by the memory means and the capacitance of the liquid crystal layer so that the DC component applied to the liquid crystal layer is removed. It is also possible to employ at least a capacitance ($C_{add}$) connected parallel with the liquid crystal layer against the memory means. The capacitance $C_{add}$ is connected to the memory means equivalent with the capacitance formed of the liquid crystal layer $C_{LC}$ so as to divide the AC voltage applied with the capacitance of the memory means $C_{mem}$. In the case, the applied AC voltage is divided by the capacitance held by the memory means ($C_{mem}$) and the capacitance which is formed of the liquid crystal layer and the capacitance connected parallel with the liquid crystal layer ($C_{LC}+C_{add}$).

In addition to the seventh aspect, a ninth aspect of the liquid crystal display device of the invention is where the capacitance of the memory means varies in an approximately symmetrical form about a predetermined voltage with respect to the applied data signal. The approximately symmetry here means that the relation (a C-V characteristic) between a voltage V of the applied data signal and a capacitance C of the memory means varies in an approximately symmetrical form about a predetermined voltage (variable depending on a specific structure of the memory means). And, the C-V characteristic of the memory means may be asymmetric when the liquid crystal has an asymmetric characteristic.

In addition to the seventh aspect, a tenth aspect of the liquid crystal display device of the invention is where the memory means has a first ferroelectric capacitor having a first polarity and a second ferroelectric capacitor having a second polarity which is converse to the first polarity connected in parallel with the first ferroelectric capacitor.

In addition to the seventh aspect, an eleventh aspect of the liquid crystal display device of the invention is where the memory means has a capacitor which is formed of a ferroelectric substance movably inserted between a pair of electrodes, and overlap of the electrodes and the dielectric substance is variable corresponding to the data signal. The dielectric substance includes both a paraelectric substance and a ferroelectric substance.

A twelfth aspect of the liquid crystal display device of the invention comprises a liquid crystal layer intervened between a first electrode and a second electrode; a voltage applying means for applying an AC voltage to the first electrode or the second electrode; a first polar memory element which is connected to the second electrode and has an asymmetrical capacitance variance with respect to a voltage applied; a second polar memory element which is connected to the second electrode in parallel with and having a reverse polarity from the first polar memory element and has an asymmetrical capacitance variance with respect to a voltage applied; and a signal applying means for applying a data signal to the first and second polar memory elements.

A thirteenth aspect of the invention comprises an array substrate which has a plurality of pixel electrodes arranged in a matrix; an opposed substrate having an opposed electrode which is opposed with the array substrate through a liquid crystal layer; a memory means which is connected in series with the respective pixel electrodes and holds the data signal as a capacitance variable corresponding to the data signal; and means for applying an AC voltage to the opposed electrode. The memory means is provided for every pixel and holds the data signal corresponding to the pixel. On the other hand, since the AC voltage is applied as a signal common to the opposed electrode (formed over the plurality of pixels), the structure of the liquid crystal display device can be simplified.

When the liquid crystal capacitance asymmetrically depends on the positive or negative of a voltage to be applied, a memory capacitative element having an asymmetrical capacitance changing characteristic with respect to the voltage to be applied is used. And, the AC voltage to be applied to the second electrode is also accordingly a symmetrical.

Examples of the polar memory element include an element having the above-described multilayered structure of a metal electrode, a ferroelectric layer and a semiconductor layer; an element having the structure which has an insulator between a ferroelectric layer and a semiconductor layer, and an element having the structure which has a metal electrode and an insulator between a ferroelectric layer and a semiconductor layer.

The signal applying means applies, for example, data signals mutually having a reverse polarity to the first and second polar memory elements.

With the liquid crystal display device of the invention, a data signal as image information for displaying halftone on each pixel can be stored in the pixels of the liquid crystal display device. As a result, the frequent refresh of pixels can be omitted during the display of a still image. Therefore, power consumption can be reduced substantially.

And, with the liquid crystal display device of the invention, whatever data signal is held by the memory element, a voltage corresponding to the data signal can be applied in an analog fashion to the liquid crystal layer. As a result, it is possible to store the data signal of halftone and to display halftone in each pixels, and a liquid crystal display device having very high image quality can be achieved.

FIG. 9A and FIG. 9E are diagrams for describing the basic structure of a pixel in the liquid crystal display device of the invention. A liquid crystal layer 2 is connected in series with a memory unit 30 for holding a data signal. In FIG. 9E, the liquid crystal layer 2 is connected in series with the memory unit 30 which holds the data signal as a capacitance variable corresponding to a level of the data signal. In FIG. 9A, the memory unit 30 comprises memory elements 6a, 6b. And, terminals 30b, 30c are generally kept at substantially the same potential to each other.

The memory unit 30 has a nearly symmetrical C-V characteristic. With the liquid crystal display device of the invention, to achieve gradational display, the memory unit 30 is formed of a memory element having the capacitance variable corresponding to the data signal, such as a variable capacitance element (variable capacitor). FIG. 9A shows one example of the structure of the memory unit 30. The memory unit 30 is formed of a pair of ferroelectric capacitors having a different polarity connected in parallel.

FIG. 9B and FIG. 9C are diagrams for describing the structure of the memory element 6. The memory elements 6a, 6b are formed of a multilayered structure (MFS structure) of a metal electrode 7, a ferroelectric layer 8 and a semiconductor layer 9 as shown in FIG. 9C. And, the memory elements 6a, 6b may have an MFIS structure with an insulator intervened between the ferroelectric layer 8 and the semiconductor layer 9 or an MFMIS structure with the second metal electrode and the insulator intervened between the ferroelectric layer 8 and the semiconductor layer 9.

And, the memory element 6 may be formed of a variable capacitor. For example, an electric field produced by electrodes which are mutually opposed with a ferroelectric substance movably intervened therebetween and the overlap of the dielectric substance are varied to vary the capacitance. The dielectric substance includes both a paraelectric substance and a ferroelectric substance.

FIG. 9D shows a capacitance-voltage characteristic (C-V characteristic) of the memory element having the structure of FIG. 9C using amorphous silicon as the semiconductor layer 9. In a general metal-insulator-semiconductor structure (MIS structure), when a positive voltage is applied to the metal, an electric charge is accumulated on a boundary of the semiconductor and the insulator at a voltage of a threshold voltage or higher, and the capacitance is increased as indicated by a profile 11a in FIG. 9D. When the ferroelectric substance is used to configure the inside of the memory element 6, it is known that the C-V characteristic is shifted to right or left as indicated by profiles 11b, 11c in FIG. 9D because of a remanent polarization Pr which is generated if an electric field exceeding a coercive electric field is generated.

As described above, the memory element having the above-described structure has an asymmetric C-V characteristic. Therefore, an arrow is added to the terminal of the electrode to indicate the polarity of the memory element as shown in FIG. 9B.

The above-described MFS structure will be described with the polarity reversed and connected in parallel. FIG. 10B and FIG. 10C are diagrams showing examples of the structure of the memory unit 30. The C-V characteristics of the respective memory elements are assumed to be substantially the same. Remanent polarizations of the ferroelectric substances in the respective memory elements 6a, 6b are generated by applying an electric field exceeding a coercive electric field between the terminals 30b and 30c. When it is seen from the terminals 30b and 30c, the polarities of the memory elements 6a, 6b are in the same direction. By the generation of the remanent polarizations in the ferroelectric substances, the C-V characteristic of each memory element 6a, 6b is shifted, and its level is the same between the two memory elements 6a, 6b.

A terminal 30d will be described with the terminals 30b, 30c connected as shown in FIG. 10C. At this time, when it is seen from the terminals 30a and 30d, the polarities of the memory elements 6a, 6b are in the opposite direction to each other.

FIG. 10A is a diagram showing an example of the C-V characteristic of the memory unit 30. The C-V characteristic between the terminals 30a and 30d is identical to a characteristic obtained when the C-V characteristics of the two memory terminals 6a and 6b are overlaid in an opposite direction. And, the C-V characteristic is symmetrical about the vertical axis (ground potential) as shown in FIG. 10A. Besides, since the threshold voltages of the memory elements 6a, 6b vary by the same extent depending on the magnitude of a remanent polarization as indicated by a dotted line in the same drawing, the extension of the C-V curve varies without losing the symmetric form. Using the C-V characteristic shown in FIG. 10A, the present invention controls the voltage to be applied to the liquid crystal layer 2. When the memory unit 30 has a symmetrical C-V characteristic, only an AC voltage can be applied to the liquid crystal layer.

FIG. 9A shows a series connection of the memory unit 30 and the liquid crystal layer 2 which have the parallel structure of the memory element 6 shown in FIG. 10B and FIG. 10C. In FIG. 9A, a switch 10 is provided for making the description simple. This switch can be omitted.

To write a data signal as image information into the memory unit 30, a predetermined voltage is applied between the terminals 30b and 30c with the switch 10 off. The applied voltage is determined to be at a level that an electric field exceeding a coercive electric field is generated in the ferroelectric substance in the memory elements 6a, 6b and a remanent polarization corresponding to the data signal is generated. When the memory elements 6a, 6b are designed to have the same structure, the remanent polarization to be generated is also same in the respective memory elements 6a, 6b.

Upon completing writing the data signal, the switch 10 is turned on, and the terminals 30b, 30c are controlled to have a ground potential. On the other hand, an AC voltage symmetrical about the ground potential is applied to the terminal 30a. The applied voltage is divided by the liquid crystal layer 2 and the memory elements 6a, 6b. At this time, it is designed not to generate an electric field exceeding a coercive electric field in the ferroelectric substances within the memory elements 6a, 6b. Since the parallel structure of the memory elements 6a, 6b has a C-V characteristic symmetrical about the ground potential, the voltage change of the terminal 30e is also symmetrical. As a result, the divided AC voltage is applied to the liquid crystal layer 2. Since this voltage division is so effected that the DC component to be applied to the liquid crystal layer is excluded, the liquid crystal layer can be prevented from being deteriorated.

A point of symmetry of the C-V characteristic of the memory unit 30 is not required to be the ground potential. By displacing the voltage between the terminals 30b, 30c and the terminal 30a corresponding to the deviation from the ground potential, the AC voltage is applied to the liquid crystal layer 2.

When the AC voltage can be applied to the liquid crystal layer 2, it is quite effective against the liquid crystal from being deteriorated. If the voltage to be applied to the liquid crystal includes a DC component, degradation of the liquid crystal, called as image sticking, is caused due to the localization or the like of the electric charge on the liquid crystal orientation film or the like. But, in the present invention, since a perfect AC voltage can be applied to the liquid crystal layer 2, the liquid crystal is not deteriorated at all, and a very reliable liquid crystal display device can be achieved. And, the capacitance which is variable with the pixel or time can be dealt with.

And, the liquid crystal display device of the present invention can control the voltage to be applied to the liquid crystal layer 2 in an analog fashion by varying the threshold voltages of the respective memory elements 6a, 6b. As the operation range of the memory elements 6a, 6b, by applying the data signal in a region where the C-V curve of the memory unit 30 varies gradually corresponding to the applied voltage and in the horizontal regions of the characteristic before and after the former region as shown in FIG. 10A, the capacitances of the memory elements 6a, 6b vary corresponding to the threshold voltages of the memory elements 6a, 6b. As a result, the voltage to be applied to the liquid crystal layer 2 can be varied in an analog fashion without varying the voltage to be applied to the terminal 30a. Besides, since the symmetry of the C-V characteristic of the memory unit 30 which has the parallel structure of the memory elements 6a, 6b is retained, the DC voltage component is not applied to the liquid crystal layer 2.

FIG. 12 is a diagram to describe a state of the ferroelectric substance in the memory elements 6a, 6b while the data signal is being written and the written data signal is being displayed. Description will be made with reference to the hysteresis curve of the ferroelectric substance.

To write the data signal into the memory unit 30 comprising the memory elements 6a, 6b, an electric field exceeding a coercive electric field Ec is applied to the ferroelectric substance, then the electric field is cleared to zero. Storage in the ferroelectric substance is made as a remanent polarization Pr corresponding to the data signal. If information had been stored in the ferroelectric substance, an electric field less than a coercive electric field −Ec is applied to the ferroelectric substance to clear the stored information, and an electric field of Ec or higher is applied to write new information. The magnitude of the remanent polarization Pr depends on the magnitude of the applied voltage.

On the other hand, in the image displayed state, the generation of an electric field in the ferroelectric substance within the memory elements 6a, 6b is less than the coercive electric field. Therefore, the remanent polarization Pr does not vary and its operation is limited to the range shown in FIG. 12. The invention uses the magnitude of the remanent polarization Pr to control gradation. Since the remanent polarization Pr is quite stably held by the ferroelectric substance, memory for the data signal of halftone is outstanding.

According to the present invention, by storing the data signal as image information in the pixel, an image is displayed by simply applying a common AC voltage to the liquid crystal layer, the image is not required to be reloaded frequently, and particularly power consumption can be lowered extensively when a still image is displayed.

Besides, even when the AC voltage applied to the terminal 30a is cut, namely even when the power of the liquid crystal display device is cut, the data signal is held continuously. Therefore, by applying the AC voltage to the terminal 30a again, the data signal stored in the memory unit 30 is displayed as an image again. On this point, power consumption can also be lowered.

The present invention is satisfactory when the C-V characteristic in the memory unit 30 is symmetrical and a range where the capacitance varies gradually with respect to the applied voltage or this range and its before and after horizontal regions can be used as the operation range. Therefore, the C-V characteristics of the memory elements 6a, 6b are not limited to the characteristic shown in FIG. 10 and may have the V shape shown in FIG. 15. The characteristic shown in FIG. 15 is limited to a case that the generation of a carrier in the semiconductor layer follows a measurement frequency. In this case, a symmetrical C-V characteristic can be obtained by connecting in parallel the respective memory elements 6a, 6b in a reverse characteristic to configure the memory unit 30.

DESCRIPTION OF PREFERRED EMBODIMENTS (Embodiment 1)

Figure 1:
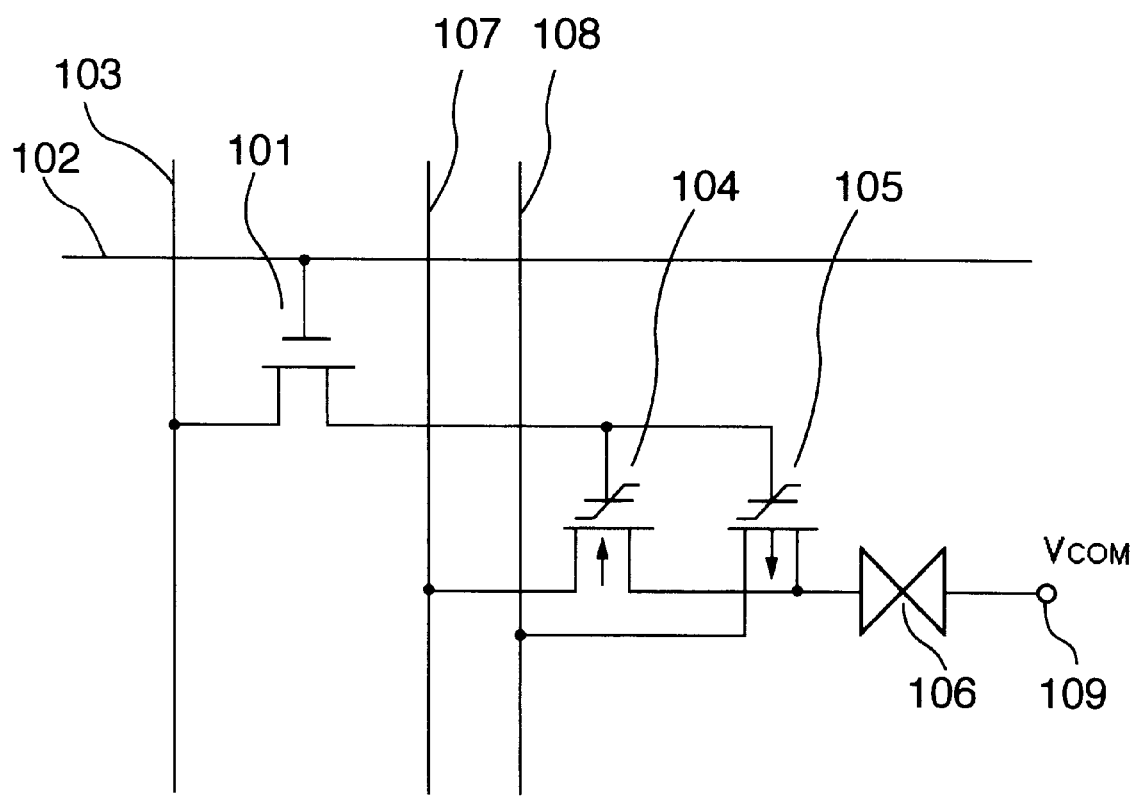
FIG. 1 is an equivalent circuit diagram showing an example of the structure of a pixel of the liquid crystal display device according to the invention.

FIG. 1 is an equivalent circuit diagram showing an example of the structure of a pixel of the liquid crystal display device according to the invention. A pixel modulates the intensity of incident light and emits the modulated light. Such a pixel is arranged in matrix to modulate the intensity of light in two dimensions, thereby displaying.

As shown in FIG. 1, a unit pixel has a pixel selecting transistor 101. The pixel selecting transistor 101 is selected corresponding to a scan signal to be applied to a scanning line 102. When it is on, a selecting signal to determine a state of the pixel applied to a selecting signal line 103 is applied to a switching element for applying a data signal to a pixel electrode. In the circuit shown in FIG. 1, the data signal is provided in two systems. Either a first data signal or a second data signal is selectively applied to the pixel electrode by an n-channel transistor 104 and a p-channel transistor 105.

Gates of the n-channel thin film transistor 104 and the p-channel thin film transistor 105 are connected to the drain of the pixel selecting transistor 101. A ferroelectric substance is formed around the gates of the thin film transistors 104, 105, and the thin film transistors 104, 105 can hold an on or off state corresponding to a state of internal polarization. Here, the ferroelectric substance is provided on at least a part of the gate insulator films of the thin film transistors 104, 105. It is possible to form the ferroelectric layer so as to cover the gate insulator of the thin film transistors. Sources of the n-channel transistor 104 and the p-channel transistor 105 are connected to a first signal line 107 and a second signal line 108, respectively. And, drains of the n-channel thin film transistor 104 and the p-channel thin film transistor 105 are connected to one of the electrodes which hold a liquid crystal layer 106 therebetween to apply an electric charge to the liquid crystal layer 106. In this case, the drains of the n-channel thin film transistor 104 and the p-channel thin film transistor 105 are connected to the pixel electrode. The other electrode of the liquid crystal layer 106 is an opposed electrode 109.

Figure 2:
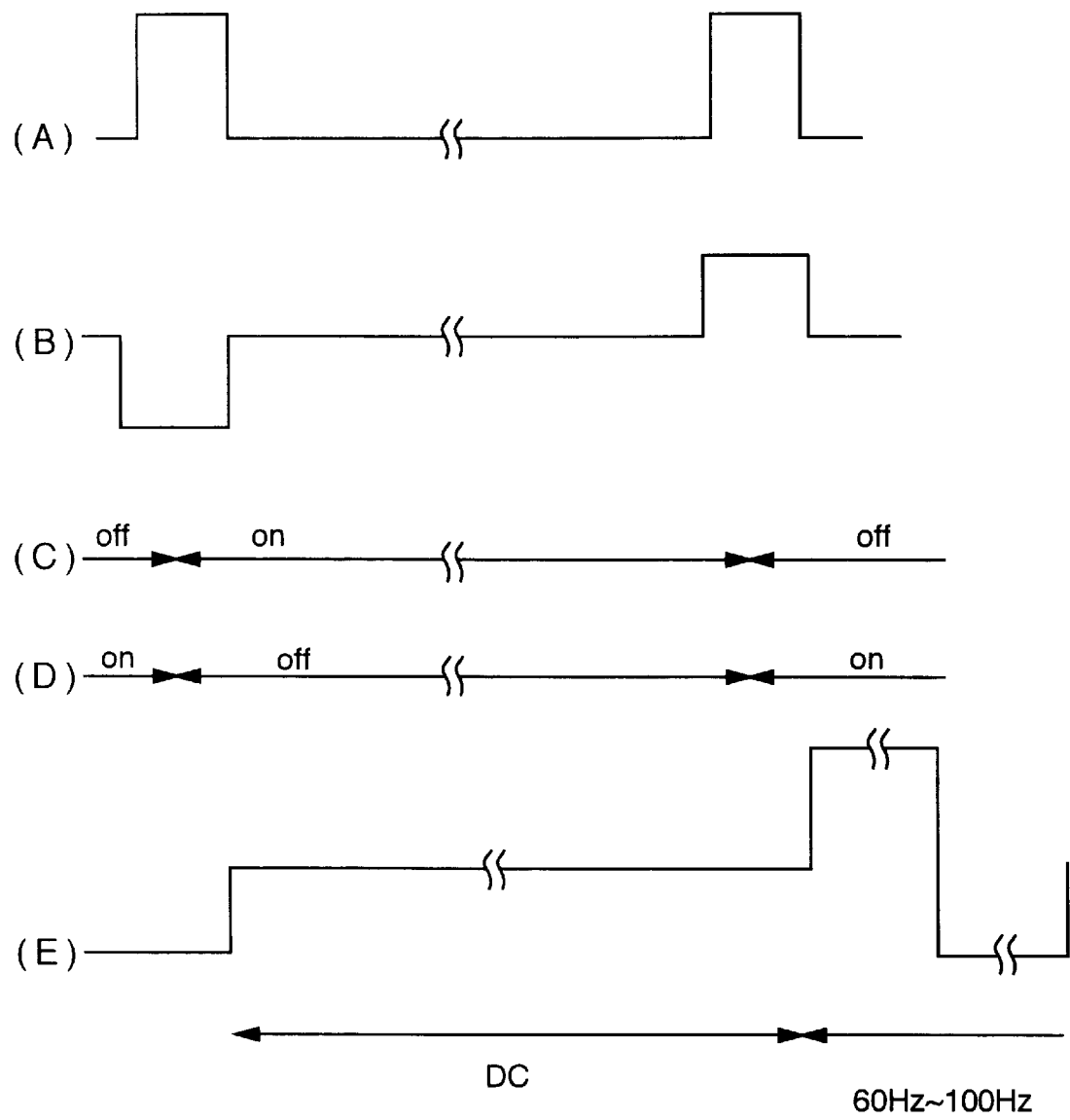
FIG. 2 is a diagram describing the control of a pixel of the liquid crystal display device according to the invention.

FIG. 2 is a diagram describing the control of a pixel of the liquid crystal display device according to the invention. In the drawing, (A) shows an example of the waveform of a scan signal to be applied to the gate of the thin film transistor 101, and (B) an example of the waveform of a selecting signal on line to be applied to the gate of the thin film transistors 104, 105 through the source and drain of the thin film transistor 101 ((B) is the profile before sampled by the TFT 101). (C) shows an on and off state of the n-ch thin film transistor 105, and (D) an on and off state of the p-ch thin film transistor 104. And, (E) shows an example of the voltage to be applied to the liquid crystal layer 106.

It is assumed that an alternating voltage of about 60 Hz is applied to the first signal line 107 mainly with the potential of the opposed electrode 109, and a reference potential (ground potential) is applied to the second signal line 108.

When the scan signal is at the off level (FIG. 2(A)), the selecting signal is in off level (FIG. 2(B)), the thin film transistor 104 is in an off state and the thin film transistor 105 is in an on state (FIG. 2(C), (D)); the second data signal is being applied to the liquid crystal layer 106. In other words, the voltage applied to the gate of the TFT 104, TFT 105 is sampled from the line 103 having the profile (B) when the scanning pulse is at a high-level (when TFT 101 is a n-ch TFT). In this case, a data signal of 0 [V] is applied to the liquid crystal layer 106 (FIG. 2(E)).

The scan signal is at the on level (FIG. 2(A)), the thin film transistor 104 is turned on corresponding to the selecting signal, and the thin film transistor 105 is turned off. When it is assumed that the first data signal to be applied to the first signal line 107 has the same potential as the opposed electrode 109, a predetermined AC voltage is applied to the liquid crystal layer 106 (FIG. 2(E)).

Therefore, the liquid crystal layer 106 can be selectively driven by the first data signal or the second data signal. These two states are stored by the ferroelectric substance provided in the transistors 104, 105. Accordingly, an alternating voltage of a high frequency is not required to be applied to the selecting signal line 103 if an image to be displayed does not change, and low power consumption is achieved. One of the first data signal or the second data signal is complementary applied to the liquid crystal layer 106, the driving voltage applied to the liquid crystal layer 106 is not fractured or strayed. Thus, a pixel in the liquid crystal display in the invention has a capability to hold a selecting state which defines the state of displaying, for a long duration. Therefore, the liquid crystal display device in the invention reduces the power consumption and is capable of promoting a quality of displaying images.

Since the thin film transistors 104, 105 operate complementarily corresponding to the same scan signal, the pixel circuit is simplified substantially. It is possible to independently control the two thin film transistors 104, 105 by providing two selecting signal lines, but the circuit shown in FIG. 1 has a simpler external drive circuit, and the pixel and the drive circuit can be integrated highly.

It is to be noted that the data signals to be applied to the first signal line 107 and the second signal line 108 are not limited to those described above. For the first data signal and the second data signal, a DC potential or a predetermined potential may be applied. For example, the pixel may be made light (dark) by a constant potential to be applied to the first data signal line 107, and the pixel may be made dark (light) by a constant potential to be applied to the second data signal line 108. In any event, the pixel state is controlled by the selecting signal to be applied to the selecting signal line 103. To reduce the voltage to invert the polarization of the ferroelectric layer, it is possible to apply a predetermined potential as a data signal which applied onto 107, 108, during the data writing period.

(Embodiment 2)

Figure 3:
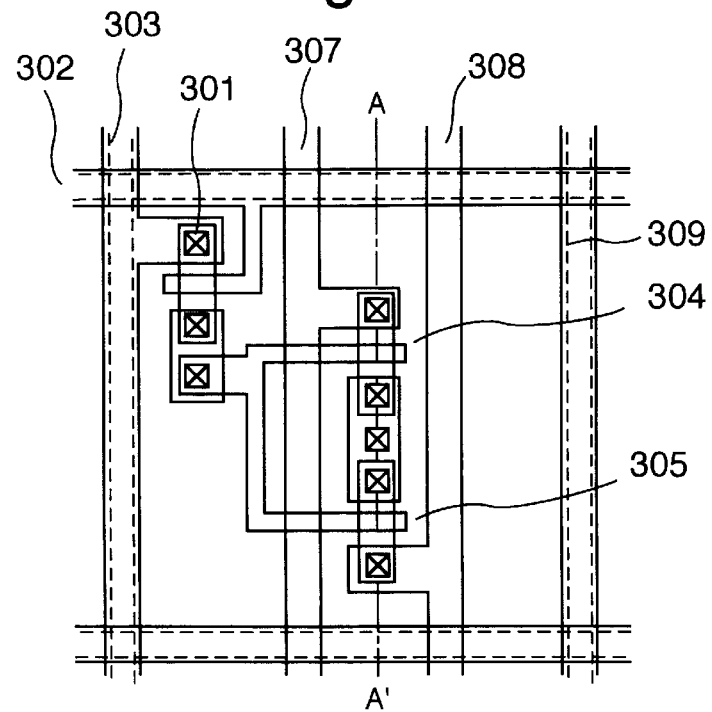
FIG. 3 is a plan view of the pixel which has achieved the pixel circuit exemplified in FIG. 1.
Figure 4:
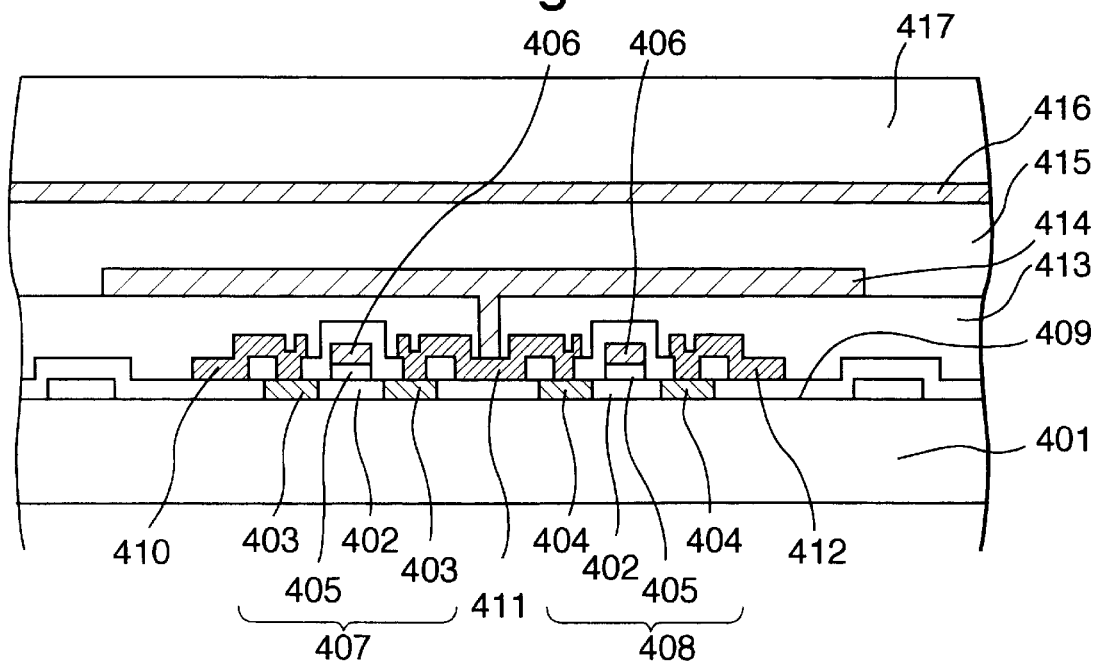
FIG. 4 is a sectional view taken on line A–A' of the pixel exemplified in FIG. 3.

FIG. 3 is a plan view (seen from the other side of the liquid crystal layer 106) of the pixel which has achieved the pixel circuit exemplified in FIG. 1, and FIG. 4 is a sectional view taken on line A–A' of the pixel exemplified in FIG. 3.

Reference numerals 301 through 309 in FIG. 3 correspond to reference numerals 101 through 109 in FIG. 1. Reference numeral 309 in FIG. 3 denotes a pixel electrode (reflective electrode) formed to cover the pixel region.

An example of the main manufacturing process of the liquid crystal display device of the invention will be described with reference to FIG. 4.

First, an amorphous silicon film is formed on an insulating substrate 401, polycrystallized by annealing with an excimer laser, and patterned into islands. A channel region 402 in an n-ch TFT 407 and a p-ch TFT 408 is formed of a polysilicon (thickness of 70 nm). In this embodiment, both the n-ch TFT and the p-ch TFT are formed of non-doped polysilicon. But, to adjust a threshold voltage of the TFT, dopant ions of phosphorous, boron or the like may be slightly doped in the channel regions of the n-ch TFT and the p-ch TFT.

Then, a gate insulator film 405 containing a ferroelectric substance is formed. In this embodiment, the gate insulator film 405 is a stacked film of a silicon oxide film (thickness of 50 nm) formed by an ECR-CVD method and a ferroelectric film (thickness of 20 to 400 nm) formed of barium titanate ($BaTiO_3$). The gate insulator film 405 may have a single-layered structure of a ferroelectric substance, have an insulator film formed on a ferroelectric film, have a three-layered structure, or have an intermediate electrode intervened between a ferroelectric film and a paraelectric film.

For the ferroelectric substance, perovskite oxide such as PZT ($[Pb(Zr, Ti)O_3]$), and a layered oxide perovskite (such as $Bi_4Ti_3O_{12}$) may be used; and an organic material (a mixture of vinylidene fluoride (VDF) and trifluoroethylene (TrFE)) may also be used.

The film forming method may include a sputtering method, a sol-gel method, a laser abrasion method, and a CVD method.

A gate electrode 406 is formed on the gate insulator film 405 formed as described above, and dopant ions of phosphorous or boron are doped by an ion doping method to form a source region and a drain region. The n-ch TFT 407 has phosphorous doped in the source region and the drain region 403, and the p-ch TFT 408 has boron doped in the source and drain region 404. Thus, they are given an LDD (lightly doped drain) structure, and a region with an intermediate dopant concentration was formed between the source and drain region and the channel region. The TFT was thoroughly covered with a layer insulator film 409 such as a silicon oxide film or silicon nitride film, formed through holes, and then formed source and drain electrodes and wirings 410, 411, 412 to be connected thereto. And, a second layer insulator film 413 of acrylic resin or BCB (benzocyclobutene) was formed thereon, through holes were formed, and a pixel electrode 414 was formed. The pixel electrode 414 is a reflective electrode, and its surface is covered with a metal having a high reflectance, such as aluminum.

Thus, a TFT array is completed, and a display device is completed by providing a liquid crystal between an opposed substrate 417 and an opposed electrode 416 each formed of glass or plastics.

For the liquid crystal, a guest host type was used. The host liquid crystal turned by 90 to 360 degrees and an amorphous guest host type which is oriented at random are effective in enhancing contrast and reflectance. And, a TN type may be used, and a selective reflection-transmission mode using a cholesteric liquid crystal, a ferroelectric liquid crystal, an anti-ferroelectric liquid crystal, a polymer-dispersed liquid crystal, or an OCB mode liquid crystal may also be used. A display method is also arbitrary, and may be any type to obtain transmission-absorption, transmission-dispersion, or dispersion-absorption in view of classification based on optical changes. Since the number of pixels is great, it is preferable to use a reflection type which has the pixel electrode formed by providing an insulator film on the element. But, a transmission type can also be used depending on the pixel size. The display can be monochrome or color. And, the liquid crystal layer may be a single layer or a multiple layer.

In the structure of FIG. 4, the pixel electrode covers the TFT and wirings, but since a predetermined data signal is always (including a period that the pixel is not selected) supplied to the liquid crystal, the present invention is free from a disadvantage of suffering from noise due to parasitic capacitance due to the pixel electrode and other wirings such as a signal line and a scanning line different from a conventional one, and display quality is improved. Conventionally, when the drive element such as TFT is covered with the pixel electrode, parasitic capacitance is generated between the pixel electrode and the drive element, adversely affecting on the electric characteristics of the drive element. As a result, display quality was affected adversely. On the other hand, the liquid crystal display device of the present invention has a transistor containing a ferroelectric substance provided below the pixel electrode, so that the deterioration of display quality due to the parasitic capacitance is prevented.

The pixel selecting transistor 101 in FIG. 1 is not limited to single, but a circuit having two transistors which has an AND that a signal line voltage is applied to only a crossing point of scanning lines wired lengthwise and crosswise can also be used. Besides, a circuit may be designed to read information of a single selecting line to select a pixel and receive a signal.

In the above embodiment, a transistor was used for the polysilicon TFT (p-Si TFT), but it may be an amorphous silicon TFT (a-Si TFT), a crystallite silicon ($\mu$c-Si), or a silicon-germanium alloy. And, the thin film transistor structure is not limited to the planar type but may be a staggered type or an inverted staggered type. And, it may be a self-alignment type or a non-self alignment type.
(Embodiment 3)

Figure 5:
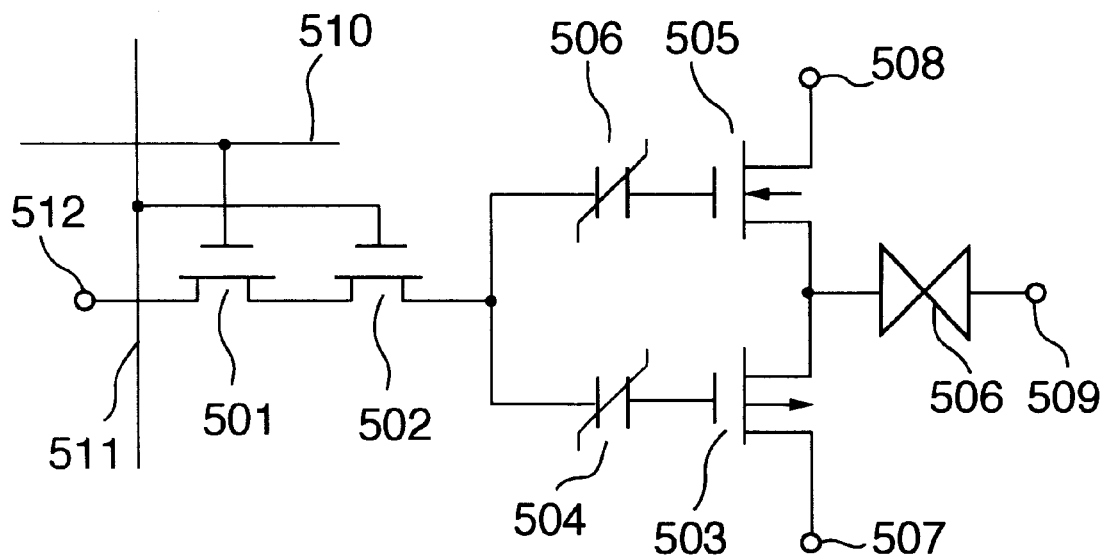
FIG. 5 and FIG. 6 are equivalent circuit diagrams showing other examples of the structure of a pixel of the liquid crystal display device of the invention.

FIG. 5 is an equivalent circuit diagram showing another example of the structure of a pixel of the liquid crystal display device of the invention. In this embodiment, an n-channel transistor 505 and a p-channel transistor 503 are a common field effect transistor, and its channel unit is formed of polysilicon or amorphous silicon. The n-channel or p-channel is determined whether a carrier produced by the dopant in the source and drain regions is an electron or a hole. The ferroelectric substance is formed of ferroelectric capacitors 504, 506 connected to a gate electrode.

To apply a voltage to this pair of thin film transistors 503, 505, two pixel selecting transistors 501, 502 are provided. When both a first scanning line 510 and a second scanning line 511 are at a high level (the transistors 501, 502 are the n-channel), a voltage of a selecting signal line 512 is applied to the ferroelectric capacitors 504, 506. Thus, a selecting signal can be applied selectively to a desired pixel.

In the circuit of FIG. 5, the ferroelectric substance and the transistors are separated, and this circuit can be produced readily in view of the production process.

The ferroelectric capacitors 504, 506 and the thin film transistors 503, 505 may be separated or not in the pixel. Namely, a gate insulator film formed of a ferroelectric substance and a paraelectric substance can be provided between the gate electrode and the channel of the thin film transistors 503, 505, and an intermediate electrode can be provided therebetween. And, for the electrode which comes in contact with the ferroelectric substance, an electrode formed of an oxide such as ITO (indium tin oxide), $SuRuO_3$ may be used.

The thin film transistor structure is not limited to the planar type but may be a staggered type or an inverted staggered type. The semiconductor layer of the thin film transistor may be monocrystal silicon or crystallite silicon in addition to polysilicon. Besides, a compound semiconductor such as a silicon-germanium alloy, Te or CdSe may be used.

Figure 6:
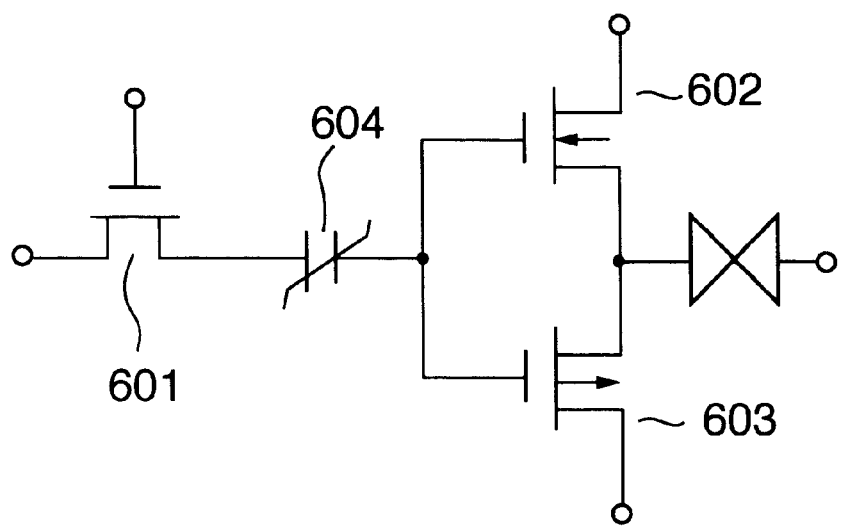
Figure 7:
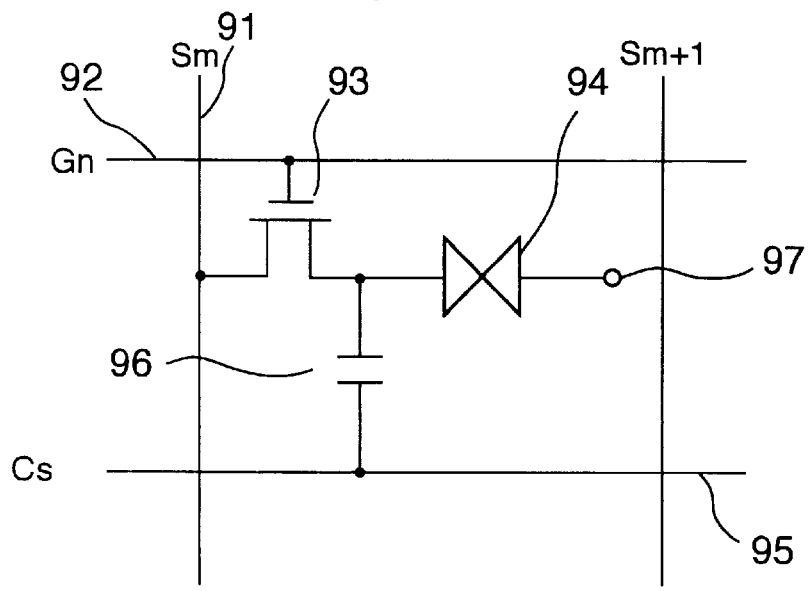
FIG. 7 is an equivalent circuit diagram showing the structure of a pixel of a conventional liquid crystal display device.

FIG. 6 is an equivalent circuit diagram showing another example of the structure of a pixel of the liquid crystal display device of the invention. In the circuit shown in FIG. 5, the ferroelectric capacitors 504, 506 are connected to the gates of the respective transistors 503, 505. But, in the circuit of FIG. 6, a first data signal and a second data signal are applied to terminals 507, 508 which have a single ferroelectric capacitor 604 provided between the drain of a pixel selecting thin film transistor 601 and the gates of thin film transistors 602, 603. The ferroelectric capacitor 604 holds the selecting signal to be applied through the source and drain of the thin film transistor 601. And, the thin film transistors 602, 603 are complementarily turned on or off corresponding to the polarized state of the ferroelectric capacitor 604 to selectively apply the first data signal or the second data signal to the liquid crystal layer 506.
(Embodiment 4)

Figure 8:
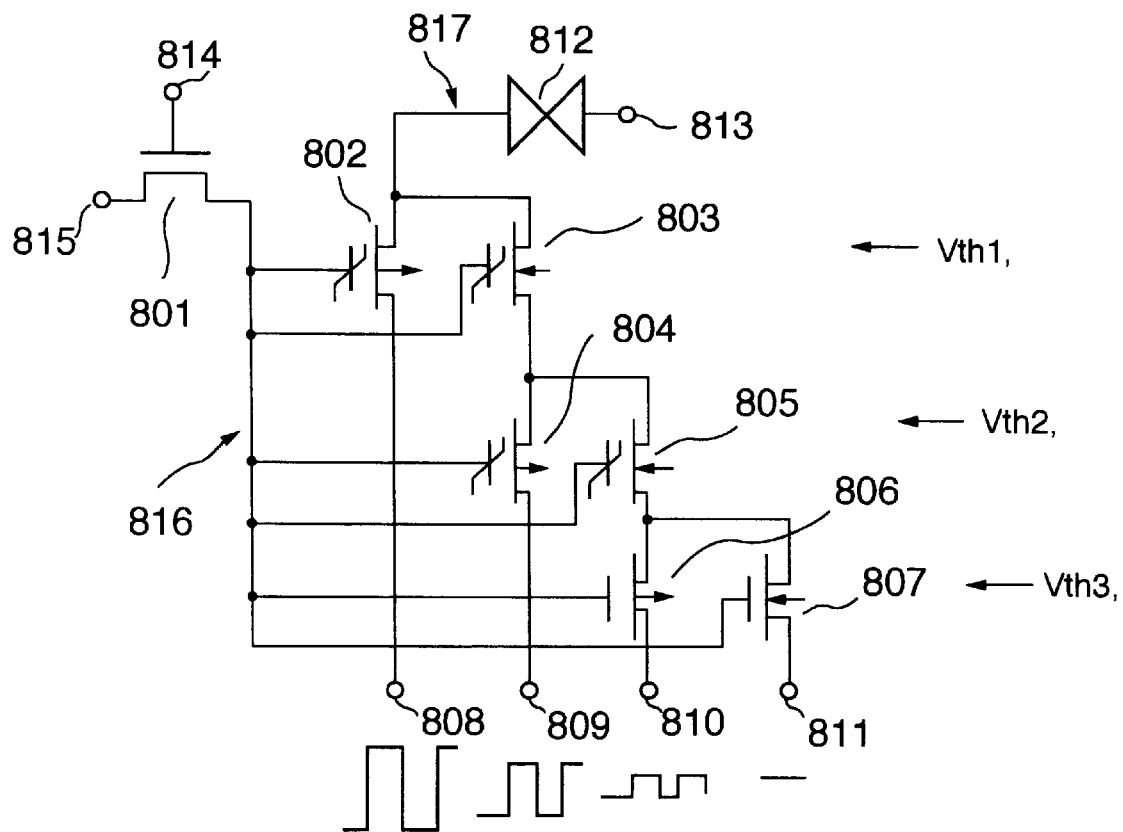
FIG. 8 is an equivalent circuit diagram showing another example of the structure of a pixel of the liquid crystal display device of the invention.
Figure 9A:
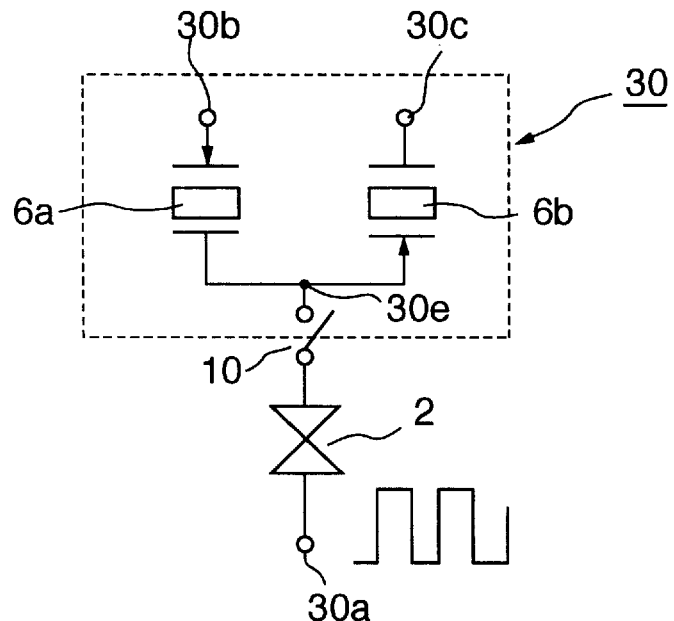
FIG. 9A, FIG. 9E and FIG. 9F are diagrams describing the basic structures of a pixel of the liquid crystal display device of the invention.
Figure 9B:
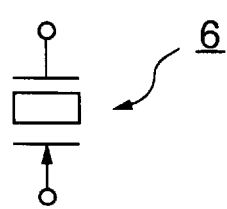
FIG. 9B and FIG. 9C are diagrams describing examples of the structure of a memory element.
Figure 9C:
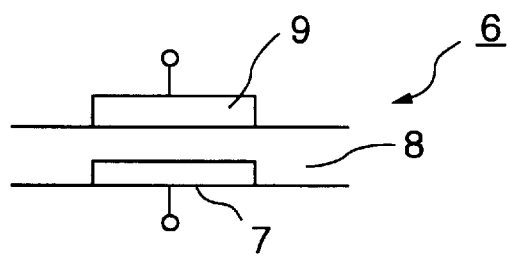
Figure 9D:
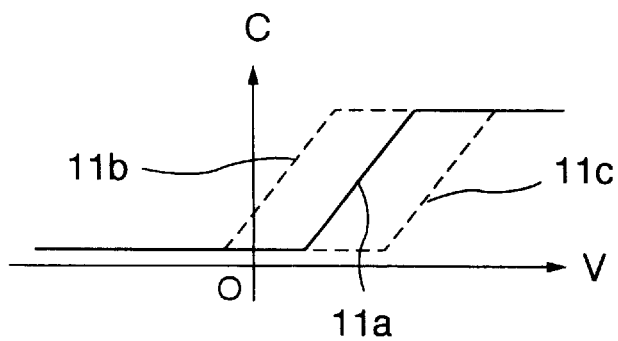
FIG. 9D is a diagram showing an example of a C-V characteristic of the memory element of FIG. 9C.
Figure 9E:
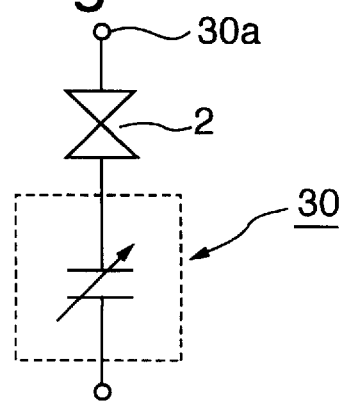
Figure 9F:
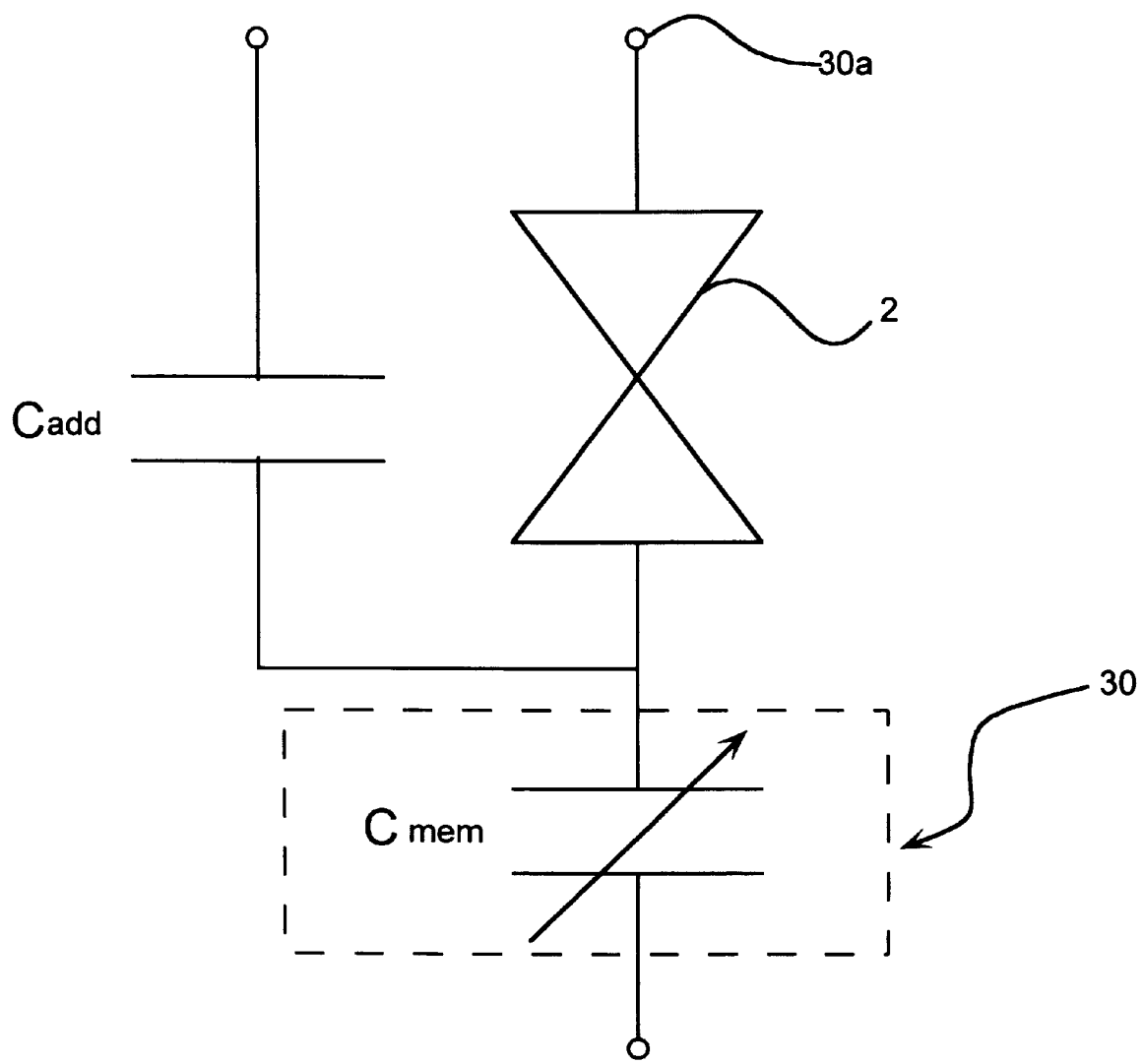

FIG. 8 is an equivalent circuit diagram showing another example of the structure of a pixel of the liquid crystal display device of the invention. In this embodiment, a data signal to be applied to a liquid crystal layer 812 is more than two types, and first to fourth data signals can be applied to the liquid crystal layer 812. And, the first data signal is applied to a terminal 808, the second data signal to a terminal 809, the third data signal to a terminal 810, and the fourth data signal to a terminal 811. A scan signal is applied to a terminal 814, and a selecting signal is applied to a terminal 815.

In FIG. 8, a pair of p-channel and n-channel transistors 802, 803 are provided with respect to the liquid crystal layer 812, and a ferroelectric substance is provided as a gate insulator film at the gates of these thin film transistors. By reversing the polarization of the ferroelectric substance by the selecting signal, the thin film transistors 802, 803 are complementarily turned on or off when a predetermined gate voltage Vth1 is applied.

A pair of p-channel and n-channel transistors 804, 805 are connected to the source and drain of the thin film transistor 803. The ferroelectric substance is also formed at the gates of these transistors 804, 805. But, a threshold voltage Vth2 of these transistors 804, 805 is different from the threshold voltage Vth1.

Besides, a pair of p-channel and n-channel transistors 806, 807 are connected to the source and drain of the thin film transistor 805. These transistors have threshold voltages Vth3, Vth3', respectively. The gates of these thin film transistors 802, 803, 804, 805, 806, 807 are connected one another, and driven by the selecting signal applied through a pixel selecting transistor 801.

When the selecting signal from the pixel selecting transistor 801 is at a sufficiently negative level, the thin film transistor 802 is turned on. At this time, the first data signal is applied to the liquid crystal layer 812 from the terminal 808 which is connected to the first signal line.

When it is assumed that Vth1<Vth2<Vth3 and a voltage indicated by reference numeral 816 exceeds Vth1, the signal of the signal line 809 is applied to the liquid crystal layer 812 because the transistor 802 is turned off and the transistor 803 is turned on.

When the selecting signal to be applied to the thin film transistors 802, 803, 804, 805, 806, 807 exceeds a level Vth2, the thin film transistor 804 is turned off, and the thin film transistor 805 is turned on. Since the thin film transistor 806 remains on, the third data signal applied to the third terminal 810 which is connected to the third signal line is applied to the liquid crystal layer 812.

When the selecting signal to be applied to the thin film transistors 802, 803, 804, 805, 806, 807 exceeds a level Vth3, the thin film transistor 806 is turned off, and the thin film transistor 807 is turned on. And, the fourth data signal is applied to the liquid crystal layer 812 from the terminal 811 which is connected to the fourth signal line. As described above, the first through fourth data signals may be an alternating voltage or a direct current. For example, by applying a different constant potential to the first through fourth signal lines, gradational display can be made. And, when the display does not change, no alternating voltage is required to be applied to the selecting signal line, so that power consumption can be lowered extensively.

By configuring as described above, four different data signals can be switched and applied to the liquid crystal layer 812. And, switching among the different data signals is stored by the remanent polarization of the ferroelectric substance.

To change the threshold voltage Vth of the thin film transistors 802, 803, 804, 805, 806, 807, a method of varying a thickness of the ferroelectric substance may be used for example. Besides, there is another method which varies a thickness of the gate insulator film formed of the paraelectric substance. And, dopant ions may be doped into the channel with varying dosage.

A method of connecting the ferroelectric capacitor as shown in FIG. 5 and FIG. 6 may also be used. Thus, gradation can be obtained.

The data signal to be applied to the terminals 808, 809, 810, 811 may be applied from outside. And, by applying the data signal from outside to, for example, the terminals 808, 811 only, the data signal to be applied to the terminals 809, 810 may be generated within the pixel by dividing the resistance or dividing the capacitance within the pixel.

Furthermore, various modifications may be made without departing from the spirit and the scope of the invention.

As described above in detail, the liquid crystal display device of the invention can achieve the reduction of power consumption. Since a predetermined potential is always applied to the liquid crystal layer, good image quality can be obtained. And, the circuit can be simplified, and a liquid crystal display device with higher definition can be provided.

(Embodiment 5)

Figure 13A:
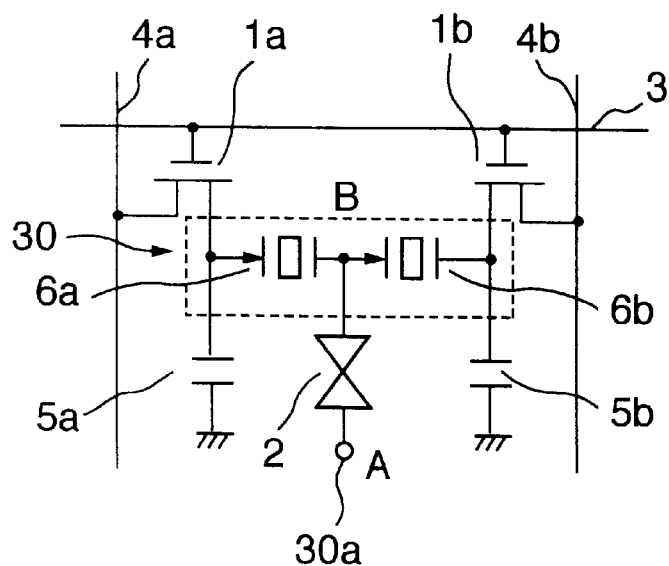
FIG. 13A and FIG. 13B are diagrams showing examples of the circuit structures of a pixel of the liquid crystal display device of the invention.
Figure 13B:
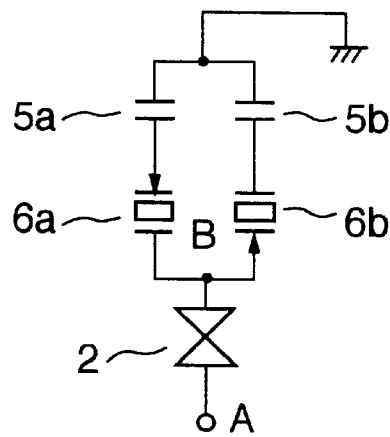

FIG. 13A, FIG. 13B are diagrams showing examples of the circuit structures of a pixel of the liquid crystal display device of the invention. Such a pixel is arranged in array to configure a display screen. Each pixel is provided with two selecting thin film transistors 1a, 1b. Gate electrodes of the respective thin film transistors 1a, 1b are connected to a scanning line 3, and turned on by a scan signal to select a pixel. Drain electrodes of the thin film transistors 1a, 1b are connected to signal lines 4a, 4b, respectively. And, source electrodes of the thin film transistors 1a, 1b are connected to a memory unit 30 consisting of memory elements 6a, 6b formed of the ferroelectric substance.

Polarities of the memory elements 6a, 6b to the source electrodes of the thin film transistors 1a, 1b are different from each other. And, the source electrodes of the thin film transistors 1a, 1b are provided with storage capacitances 5a, 5b having capacitance about equal to or higher than liquid crystal capacitance between ground potential. The storage capacitances 5a, 5b have substantially the same capacitance.

One of the electrodes of a liquid crystal layer 2 is connected between the memory elements 6a and 6b, and the other electrode (corresponding to a terminal 30a in the drawing) of the liquid crystal layer 2 is connected to an opposed electrode.

An AC voltage is applied to the opposed electrode mainly with the ground potential (or a reference potential).

First, description will be made of writing of a data signal into the memory unit 30.

Since the immediately preceding data signal has been memory unit 30, a voltage with a reverse polarity is applied to reset. Specifically, a voltage is externally applied to the ferroelectric substance within the memory elements 6a, 6b to generate an electric field less than a coercive electric field –Ec. At this time, when it is assumed that the voltage to be applied to the memory elements 6a, 6b is –Vc, the scan signal of the thin film transistor 1 is sent to the scanning line 3 to turn on the thin film transistor 1, and voltages –Vc and Vc are applied to the signal lines 4a and 4b, respectively. Because of the symmetry of the circuit, the voltage –Vc is applied to the memory elements 6a, 6b to reset the immediately preceding data signal.

Then, an electric field (higher than a coercive electric field Ec) at a level with which a remanent polarization Pr corresponding to the data signal generates is caused in the ferroelectric substance in the memory elements 6a, 6b. At this time, when it is assumed that a voltage Va is applied to the memory elements 6a, 6b, the thin film transistors 1a, 1b are turned on, and voltages Va, –Va are applied to the signal lines 4a and 4b, respectively. Because of the symmetry of the circuit, the voltage Va is applied to the memory elements 6a, 6b, and the data signal is substantially equally stored in the memory elements 6a, 6b.

Figure 16A:
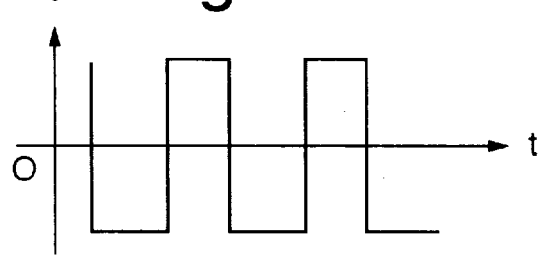
FIG. 16A, FIG. 16B and FIG. 16C are diagrams showing examples of a profile of an AC voltage to be applied to an opposed electrode.
Figure 16B:
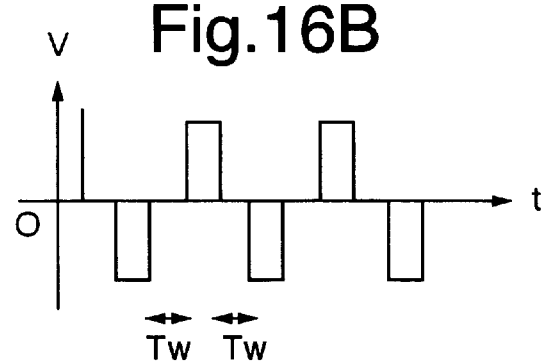
Figure 16C:
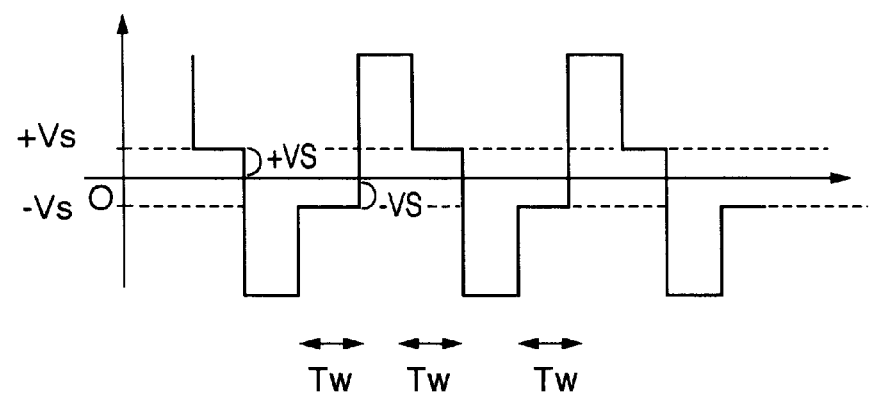

FIG. 16A, FIG. 16B, FIG. 16C are diagrams showing examples of a profile of the AC voltage applied to an opposed electrode. An AC voltage, mainly a ground potential, is applied to the terminal 30a (opposed electrode) as shown in FIG. 16A. A voltage waveform having a period for writing the data signal may be applied to the opposed electrode as shown in FIG. 16B, FIG. 16C. The applied voltage in the writing period is determined to a ground potential in FIG. 16B. In this case, since no voltage is applied to the liquid crystal layer 2 during the data signal writing time Tw, display quality is improved. In FIG. 16C, a predetermined voltage ±Vs which makes polarization reversal is applied to the opposed electrode during the writing time Tw. In other words, it is designed that the voltage to be applied to the liquid crystal layer 2 during the data signal writing time Tw becomes ±Vs.

The above-described method can also be applied when another pixel connected to the scanning line 3 has the data signal to be reloaded. And, when it is not necessary to reload the data signal as the image information, a voltage which is in a range that the remanent polarization held in the memory elements 6a, 6b which comprise the memory unit 30 does not vary can be applied. Thus, the image information of a desired pixel in the liquid crystal display device of the invention is reloaded as described above.

Now, description will be made of the behavior of the liquid crystal display 2 when a data signal is written into the memory unit 30.

The equivalent circuit of a single pixel in the liquid crystal display device of the invention shown in FIG. 13A is bilaterally symmetrical, and in principle, a voltage between the two memory elements 6a, 6b becomes equal to a ground potential during writing. But, a voltage between the two memory elements 6a, 6b may possibly vary though only a small extent due to a slight difference between the characteristics of the memory elements 6a, 6b or a slight deviation of timing to apply the scan signal or the data signal. However, it takes several ten μsec to write the data signal, while a response speed of the liquid crystal is several ten msec, and the change in voltage between the two memory elements 6a, 6b does not substantially affect on the display characteristics.

Now, description will be made of displaying of the data signal written in the memory unit 30.

The scan signal applied to the scanning line 3 is stopped to turn off the thin film transistor 1. The state of the pixel at this time can be indicated by the equivalent circuit shown in FIG. 13B. An AC voltage, mainly a ground potential, is applied to the terminal 30a. The voltage dependency of a combined capacitance of four capacitances of the storage capacitances 5a, 5b and the memory elements 6a, 6b has a symmetrical characteristic with respect to the ground potential. Therefore, an AC voltage corresponding to the voltage divided by the storage capacitance 5 and the memory elements 6a, 6b is also applied to the liquid crystal layer 2. Besides, the voltage applied to the liquid crystal layer 2 does not include a DC component, and the liquid crystal is not deteriorated.

As described above, the liquid crystal display device of the invention can apply an AC voltage to the liquid crystal layer 2 and store a data signal having analog gradation.

Figure 10A:
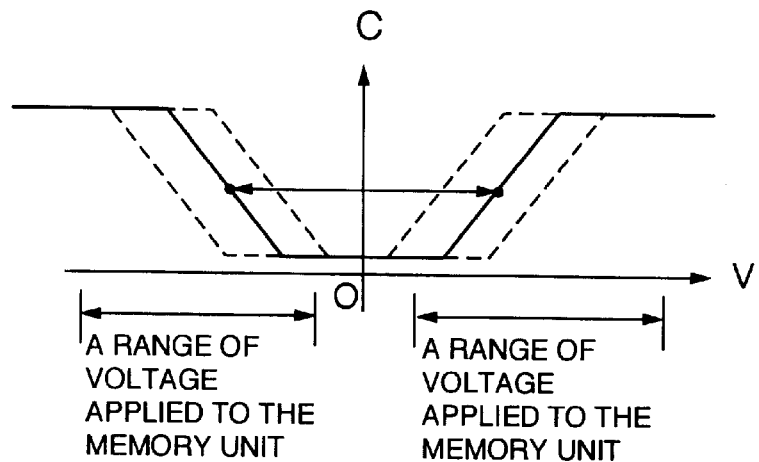
FIG. 10A is a diagram showing an example of the C-V characteristic of the memory unit which holds a data signal.
Figure 10B:
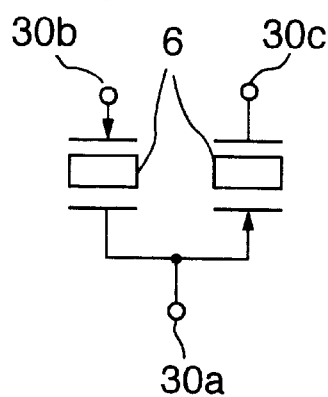
FIG. 10B and FIG. 10C are embodiments showing an example of the structure of a memory unit.
Figure 10C:
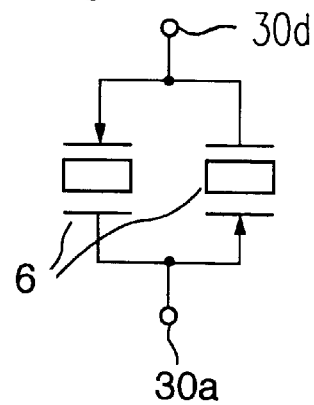
Figure 11:
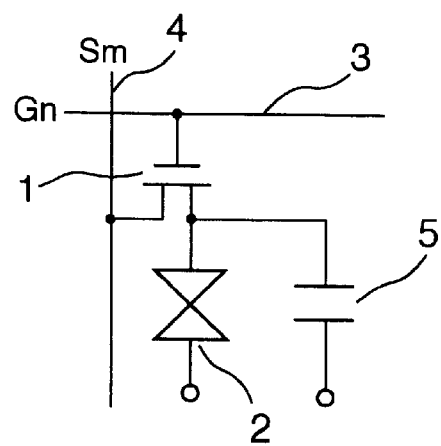
FIG. 11 is a diagram showing an example of the circuit structure of a pixel of a conventional active matrix liquid crystal display device.
Figure 12:
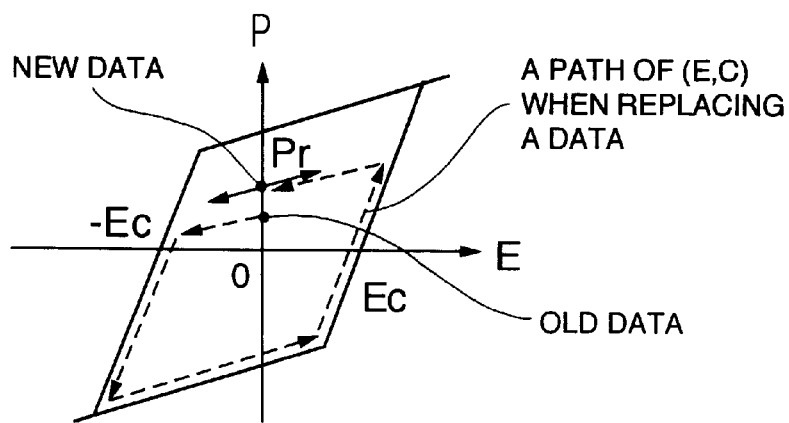
FIG. 12 is a diagram describing a state of a ferroelectric substance in a memory element during a data signal is being written and the written data signal is being displayed.

In the liquid crystal display device shown in FIG. 13A and FIG. 13B, the voltage is applied to the memory elements 6a, 6b in the region where the capacitance to be accumulated varies gradually corresponding to the applied voltage or in the horizontal regions of the characteristic before and after the former region as shown in FIG. 10A. Therefore, the voltage applied to the liquid crystal layer 2 can be controlled easily when such a region is broad.

Figure 14:
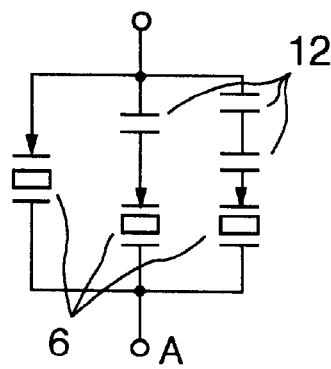
FIG. 14 is a diagram showing another example of the structure of a memory element configuring the memory unit of the liquid crystal display device of the invention.
Figure 15:
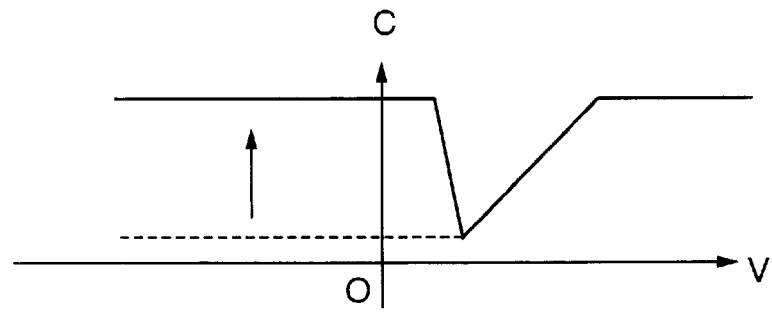
FIG. 15 is a diagram showing another example of the C-V characteristic of a memory element which can be used in the liquid crystal display device of the invention.

FIG. 14A is a diagram showing another example of the structure of the memory element 6 configuring the memory unit 30 of the liquid crystal display device of the invention. As shown in FIG. 14, memory elements 6a, 6b and a plurality of storage capacitances 12 are connected in series, and those connected in parallel are newly used as the memory elements, so that a region where the capacitance to be accumulated varies gradually corresponding to the applied voltage can be made broader by the capacitance division of the abovedescribed memory terminal 6 and the storage capacitance 12.

The memory unit 30 provided in the liquid crystal display device of the invention is not limited to the above-described structure, and it can employ another configuration which can hold a capacitance corresponding to a data signal.

For example, for a capacitor connected in series with the liquid crystal layer 2, a configuration in that a movable dielectric substance is inserted and the capacitance is variable depending on the inserted level can be adopted. At this time, the capacitor is so configured to have a symmetrical C-V characteristic. When a voltage is applied to the capacitor, a force is applied to the dielectric substance. The force is applied in a direction to pull the dielectric substance into the capacitor or in a direction to push the dielectric substance out of the capacitor corresponding to a dielectric constant of the dielectric substance. If there is a frictional force f between the dielectric substance and the capacitor, the dielectric substance is never moved by the application of a little voltage to the capacitor.

To make normal display, an AC voltage is applied to the terminal 30a to apply the voltage divided by the capacitor to the liquid crystal layer 2. Therefore, the voltage to be applied to the liquid crystal layer 2 is determined corresponding to the inserted level of the dielectric substance into the capacitor.

When the display changes, a scan signal is applied to the scanning line to turn on the transistor which is connected to a reset signal line, and a high voltage is applied from the reset signal line to the capacitor to push the dielectric substance out of the capacitor. To write a new data signal, it is preferable that the dielectric substance is thoroughly pushed out of the capacitor before resetting the old data signal held in the capacitor. However, reset may be made without completely pushing the dielectric substance out of the capacitor. Then, the transistor which is connected to the signal line is turned on, and the new data signal is selected from the signal line and applied to the capacitor. According to the magnitude of the data signal voltage, the capacitor pulls in the dielectric substance and holds the data signal as capacitance. At this time, the signal voltage may be applied with the frictional force which acts between the dielectric substance and the capacitor taken into account. The movable dielectric substance is not limited to a solid material such as a paraelectric substance or a ferroelectric substance, but may be a liquid material having a high viscosity. For example, a ferroelectric liquid crystal or a viscous fluid having fine dielectric particles dispersed may be used.

Specifically, the liquid crystal layer 2 and the memory unit 30 are connected in series in the liquid crystal display device of the invention. And, the applied AC voltage is divided in an AC fashion by the liquid crystal layer 2 and the memory unit 30. At this time, no DC component is applied to the liquid crystal layer 2. The memory unit 30 advantageously has an almost symmetrical C-V characteristic. And, gradational display can be made by forming the memory unit 30 by a variable capacitance element.

(Embodiment 6)

Figure 17A:
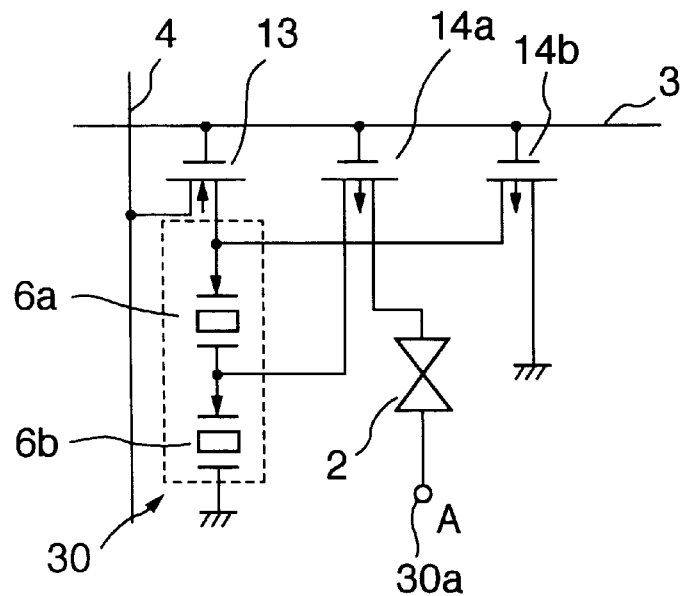
FIG. 17A and FIG. 17B are equivalent circuit diagrams showing other examples of the structure of a single pixel of the liquid crystal display device of the invention.

FIG. 17A is an equivalent circuit diagram showing another example of the structure of a single pixel of the liquid crystal display device of the invention.

Figure 17B:
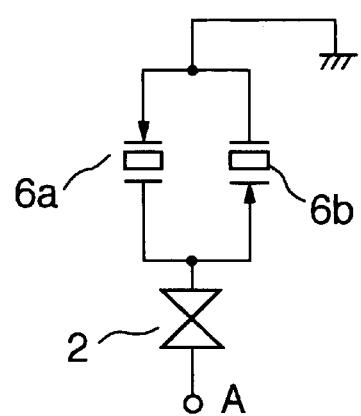
Figure 18A:
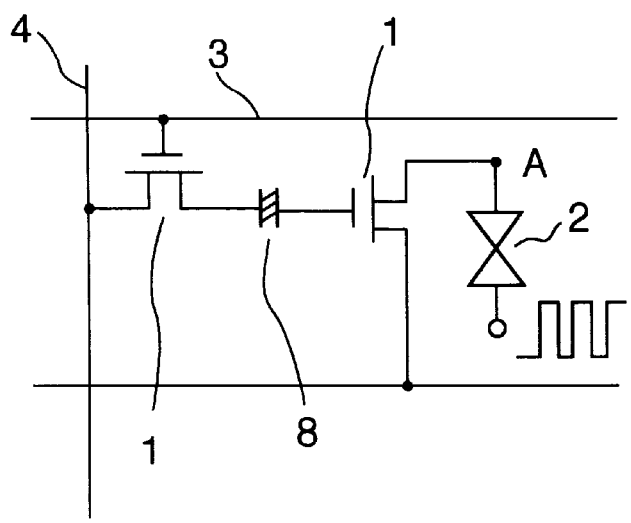
FIG. 18A and FIG. 18B are equivalent circuit diagrams showing the pixel structures of a conventional liquid crystal display device.
Figure 18B:
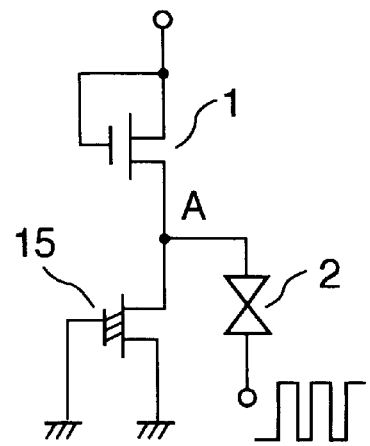

Three thin film transistors 13, 14a, 14b are provided for a single pixel. These transistors are formed with polysilicon used for a semiconductor layer. The thin film transistor 13 is an n-channel thin film transistor and used for selecting a pixel. The thin film transistors 14a, 14b are p-channel thin film transistors. Gate electrodes of the thin film transistors 13, 14a, 14b are connected to a scanning line 3. And, a drain electrode of the thin film transistor 13 is connected to a signal line 4. A source electrode of the thin film transistor 13 is connected in the polarity shown in FIG. 17 to a memory unit 30 consisting of memory elements 6a, 6b formed of the ferroelectric substance. And, the source electrode of the thin film transistor 13 is also connected to a drain electrode of the thin film transistor 14b. A source electrode of the thin film transistor 14b is grounded. A drain electrode of the thin film transistor 14a is connected between the memory element 6a and the memory element 6b.

One electrode, e.g., a pixel electrode, of the liquid crystal layer 2 is connected to the source electrode of the thin film transistor 14a and to the other electrode, e.g., an opposed electrode, of the liquid crystal layer 2 (corresponding to a terminal 30a in the drawing). An AC voltage, mainly a ground potential, is applied to the opposed electrode.

Description will be made of writing of a data signal as image information into the memory unit 30 consisting of the memory elements 6a, 6b.

Since an immediately preceding data signal has been written into the memory elements 6a, 6b, a voltage having a reverse polarity is applied to reset. Specifically, a voltage is externally applied to the ferroelectric substance in the memory elements 6a, 6b to generate an electric field less than a coercive electric field −Ec. When it is assumed that the voltage to be applied to the memory elements 6a, 6b is −Vc at this time, the scan signal of the thin film transistors 13, 14 is applied to the scanning line 3 to turn on the n-ch thin film transistor 13 and to turn off the p-ch thin film transistor 14. And, a voltage (−2×Vc) is applied to the signal line 4. The voltage −Vc is applied to the memory elements 6a, 6b to clear the already held remanent polarization Pr.

Then, an electric field at a level with which a remanent polarization Pr higher than a coercive electric field Ec and corresponding to the data signal generates is caused in the ferroelectric substance in the memory elements 6a, 6b. At this time, when it is assumed that a voltage va is applied to the memory elements 6a, 6b, the scan signal is applied to the scanning line 3, and (2×Va) is applied to the signal line 4. At this time, the p-ch thin film transistor 14a is off. Therefore, the application of the data signal to the memory elements 6a, 6b does not affect on the liquid crystal layer 2. Thus, the voltage Va is applied to the memory elements 6a, 6b, and the data signal is equally stored in the memory elements 6a, 6b. And, the p-ch thin film transistor 14b is also off, and the source and drain electrodes of the n-ch thin film transistor 13 are kept to have the same potential. The terminal 30a (opposed electrode) is advantageously applied with an AC voltage, mainly a ground potential, as shown in FIG. 16A. And, as described above, the AC voltage as shown in FIG. 16B, FIG. 16C may be applied.

Description will be made of displaying of the data signal held by the memory unit 30.

The scan signal applied to the scanning line 3 is stopped, the n-ch thin film transistor 13 is turned off, and the p-ch thin film transistors 14a, 14b are turned on. At this time, the state of the pixel can be indicated by the equivalent circuit of FIG. 17B. The AC voltage, mainly a ground potential, is applied to the terminal 30a (opposed electrode). The voltage dependency of a combined capacitance of the two memory elements 6a, 6b has a symmetrical characteristic with respect to the ground potential. Therefore, an AC voltage corresponding to the voltage divided by the memory elements 6a, 6b is also applied to the liquid crystal layer 2. Besides, the voltage applied to the liquid crystal layer 2 does not include a DC component, and the liquid crystal is not deteriorated.

As described above, the liquid crystal display device of the invention can apply an AC voltage to the liquid crystal layer 2 and store a data signal having analog gradation.

As described above, the liquid crystal display device of the invention can store a data signal having halftone image information into a pixel. Therefore, a liquid crystal display device having high display quality, high reliability and small power consumption can be provided.

What is claimed is:

1. A liquid crystal display device, comprising:
   a liquid crystal layer intervened between a first and a second electrode;
   means for applying a first data signal;
   means for applying a second data signal;
   means for exclusively holding a selecting signal; and
   a selecting means for applying the first data signal or the second data signal to the first electrode corresponding to the selecting signal held in the holding means.

2. A liquid crystal display device as set forth in claim 1, wherein the holding means is a ferroelectric substance.

3. A liquid crystal display device as set forth in claim 1, wherein the selecting means comprises a first switching element and a second switching element which turn on or off complementally corresponding to a selecting signal held by the holding means, the first switching element applies a first data signal to a first electrode when it is turned on, and the second switching element applies a second data signal to the first electrode when it is turned on.

4. A liquid crystal display device as set forth in claim 3, wherein the holding means having at least a ferroelectric substance, and the first switching element and the second switching element are turned on or off corresponding to the polarized state of the ferroelectric substance.

5. A liquid crystal display device as set forth in claim 1, wherein the selecting means comprising at least a pair of complemental MISFETs, and the holding means having at least a ferroelectric substance formed at gates of the complemental MISFETs.

6. A liquid crystal display device, comprising:
   a liquid crystal layer intervened between a first and a second electrode;
   means for applying a first data signal;
   means for applying a second data signal;
   a selecting means for exclusively applying one of the first data signal or the second data signal to the first electrode; and
   a holding means for holding a selected state of the selecting means.

7. A liquid crystal display device, comprising:
   a liquid crystal layer intervened between a first and a second electrode;
   a first signal line for supplying a first data signal;
   a second signal line for supplying a second data signal;
   a p-channel field effect transistor provided so as to connect the first signal line and a first electrode when it is turned on, and the p-channel field effect transistor having a ferroelectric substance for holding a selecting signal at a gate;
   an n-channel field effect transistor provided so as connect the second signal line and the first electrode when it is turned on, and the n-channel field effect transistor having a ferroelectric substance for holding the selecting signal at a gate; and
   means for supplying the selecting signal so that one of the first signal line or the second signal line is exclusively connected with the first electrode.

8. A liquid crystal display device, comprising:
   a liquid crystal layer intervened between a first and a second electrode;
   a first signal line for supplying a first data signal;
   a second signal line for supplying a second data signal;
   a ferroelectric substance for holding a selecting signal;
   a p-channel field effect transistor provided so as to connect the first signal line and a first electrode when it is turned on, and a potential corresponding to the selecting signal held by the ferroelectric substance is applied to a gate electrode of the p-channel field effect transistor; and
   an n-channel field effect transistor provided so as to connect the second signal line and the first electrode when it is turned on, and the potential corresponding to the selecting signal held by the ferroelectric substance is applied to a gate electrode of the n-channel field effect transistor.

9. A liquid crystal display device, comprising:

a first signal line for supplying a first data signal;

a second signal line for supplying a second data signal;

a first ferroelectric substance for holding a potential corresponding to a selecting signal;

a second ferroelectric substance for holding the potential corresponding to the selecting signal;

a p-channel field effect transistor provided so as to connect the first signal line and a first electrode when it is turned on, and the potential corresponding to the selecting signal held by the first ferroelectric substance is applied to a gate electrode of the p-channel field effect transistor; and an n-channel field effect transistor provided so as to connect the second signal line and the first electrode when it is turned on, and the potential corresponding to the selecting signal held by the second ferroelectric substance is applied to a gate electrode of the n-channel field effect transistor.

10. A liquid crystal display device, comprising:

a liquid crystal layer intervened between a first electrode and a second electrode;

means for applying a first data signal;

means for applying a second data signal; and a drive element which is covered with the first electrode, selects exclusively one of the first or the second data signal corresponding to a selecting signal to apply it to the first electrode, and the driving element having at least a ferroelectric substance for holding the selecting signal.

11. An active matrix type liquid crystal display device having pixels formed in a matrix array, comprising:

a liquid crystal layer disposed so as to interact with first electrodes and at least a second electrode, and the first electrodes being formed in respective pixels;

a memory means which is connected to the first electrode, and the memory means holds a data signal as a capacitance variable corresponding to the data signal in respective pixels;

means for supplying the data signal to respective pixels independently, the supplying means supplies the data signals to the memory means without going through the liquid crystal layer; and means for applying an AC voltage to the second electrode.

12. A liquid crystal display device as set forth in claim 11, wherein when the AC voltage is applied to the second electrode, the memory means divides the applied AC voltage by the capacitance held by the memory means and a capacitance which includes a capacitance of the liquid crystal layer.

13. A liquid crystal display device as set forth in claim 11, wherein the capacitance of the memory means varies in an approximately symmetrical form about a predetermined voltage with respect to the applied data signal.

14. A liquid crystal display device as set forth in claim 11, wherein the memory means having a first and second polar memory element having an asymmetrical capacitance law with respect to a voltage applied, and the first and the second polar memory element are connected so that the capacitance formed of the first and second polar memory element varies in an approximately symmetrical form about a predetermined voltage with respect to the applied data signal.

15. A liquid crystal display device as set forth in claim 11, wherein the memory means having a first memory element comprises a metal-ferroelectric substance-semiconductor structure having a first polarity and a second memory element comprises the metal-ferroelectric substance-semiconductor structure having a second polarity which is converse to the first polarity connected in parallel with the first memory element.

16. A liquid crystal display device as set forth in claim 11, wherein the memory means has a first capacitor having a first polarity and a second capacitor having a second polarity which is converse to the first polarity connected in parallel with the first capacitor so that the capacitance characteristics of the memory means varies in an approximately symmetrical form about a predetermined voltage with respect to the applied data signal.

17. A liquid crystal display device as set forth in claim 11, wherein the memory means has a capacitor which is formed of a dielectric substance movably inserted between a pair of electrodes, and overlap of the electrodes and the substance is variable corresponding to the data signal.

18. A liquid crystal display device, comprising:

a liquid crystal layer intervened between a first electrode and a second electrode;

a voltage applying means for applying an AC voltage to the first electrode;

a first polar memory element which is connected to the second electrode and has an asymmetrical capacitance law with respect to a voltage applied;

a second polar memory element which is connected to the second electrode in parallel with and having a reverse polarity from the first polar memory element and has an asymmetrical capacitance law with respect to a voltage applied; and a signal applying means for applying a data signal to the first and second polar memory elements.

* * * * *

UNITED STATES PATENT AND TRADEMARK OFFICE
CERTIFICATE OF CORRECTION

PATENT NO.    : 6,072,454
DATED         : June 6, 2000
INVENTOR(S)   : Nakai et al.

It is certified that error appears in the above-identified patent and that said Letters Patent is hereby corrected as shown below:

Column 2,
Line 10, after "1200" insert -- , --.

Column 5,
Line 8, delete "in a";
Line 9, change "complementary manner" to -- complementarily --;
Line 34, change "complementary" to -- complementarily --;
Line 37, change "complemental" to -- complementary --;
Line 44, after "the" insert -- invention --.

Column 6,
Line 67, after "invention" insert -- . --.

Column 7,
Line 1, change "It is also possible to" to -- The device may also --.

Column 9,
Lines 51-52, change "a symmetrical" to -- asymmetrical --.

Column 15,
Line 34, change "complementary" to -- complementarily --.

Column 19,
Line 34, after "varying" insert -- a --.

Column 21,
Line 48, change "above described" to -- above-described --.

UNITED STATES PATENT AND TRADEMARK OFFICE
CERTIFICATE OF CORRECTION

PATENT NO. : 6,072,454
DATED : June 6, 2000
INVENTOR(S) : Nakai et al.

It is certified that error appears in the above-identified patent and that said Letters Patent is hereby corrected as shown below:

<u>Column 23,</u>
Line 17, change "va" to -- Va --;
Line 63, after "means for" insert -- exclusively --.

Signed and Sealed this

Twenty-fifth Day of September, 2001

*Attest:*

*Nicholas P. Godici*

*Attesting Officer*

NICHOLAS P. GODICI
*Acting Director of the United States Patent and Trademark Office*